US011283548B2

(12) United States Patent
Li et al.

(10) Patent No.: US 11,283,548 B2
(45) Date of Patent: Mar. 22, 2022

(54) PHYSICAL DOWNLINK CONTROL CHANNEL RETRANSMISSION FOR ULTRA-RELIABLE LOW-LATENCY COMMUNICATIONS

(71) Applicant: QUALCOMM Incorporated, San Diego, CA (US)

(72) Inventors: Chih-Ping Li, San Diego, CA (US); Jing Sun, San Diego, CA (US); Jing Jiang, San Diego, CA (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/133,571

(22) Filed: Sep. 17, 2018

(65) Prior Publication Data

US 2019/0089489 A1  Mar. 21, 2019

Related U.S. Application Data

(60) Provisional application No. 62/560,625, filed on Sep. 19, 2017.

(51) Int. Cl.
*H04L 1/08* (2006.01)
*H04L 1/18* (2006.01)
(Continued)

(52) U.S. Cl.
CPC ............ *H04L 1/08* (2013.01); *H04L 1/189* (2013.01); *H04W 72/1273* (2013.01); *H04W 72/14* (2013.01)

(58) Field of Classification Search
CPC combination set(s) only.
See application file for complete search history.

(56) References Cited

U.S. PATENT DOCUMENTS

2014/0161084 A1* 6/2014 Yang ............... H04L 1/1896
370/329
2016/0143017 A1* 5/2016 Yang ............... H04W 72/0406
370/329
(Continued)

FOREIGN PATENT DOCUMENTS

EP  3098998 A1  11/2016
EP  3113561 A1  1/2017

OTHER PUBLICATIONS

Huawei et al., "Timing Relationship between PDCCH and POSCH for Coverage Improvement", 3GPP Draft; R1-135022, 3rd Generation Partnership Project (3GPP), Mobile Competence Centre, 650, Route Des Lucioles, F-86921 Sophia-Antipolis Cedex, France, vol. RAN WG1, No. San Francisco, USA, Nov. 11, 2013-Nov. 15, 2013, Nov. 13, 2013 (Nov. 13, 2013), XP050734725, 4 Pages, Retrieved from the Internet: URL:http://www.3gpp.org/ftp/Meetings 3GPP SYNC/RAN/RAN1/Docs/ [retrieved on Nov. 13, 2013].

(Continued)

*Primary Examiner* — Yee F Lam
(74) *Attorney, Agent, or Firm* — Holland & Hart LLP

(57) ABSTRACT

Methods, systems, and devices for wireless communication are described. A base station may identify a first grant repetition configuration of a plurality of grant repetition configurations for a user equipment (UE). The base station may generate a grant repetition parameter corresponding to the first grant repetition configuration. The base station may transmit the grant repetition parameter to the UE to indicate the first grant repetition configuration. The base station may transmit a repetition of grants in accordance with the first grant repetition configuration. The UE may receive the grant repetition parameter from the base station and determine a grant repetition configuration corresponding to the grant repetition parameter. The UE may monitor for a repetition of
(Continued)

grants corresponding to the determined grant repetition configuration.

28 Claims, 19 Drawing Sheets

(51) Int. Cl.
*H04W 72/12* (2009.01)
*H04W 72/14* (2009.01)

(56) References Cited

U.S. PATENT DOCUMENTS

| | | | |
|---|---|---|---|
| 2016/0164643 A1* | 6/2016 | Loehr | H04L 1/1854 370/336 |
| 2016/0182208 A1* | 6/2016 | Yi | H04B 17/24 370/329 |
| 2017/0012755 A1* | 1/2017 | Wang | H04L 1/08 |
| 2017/0013615 A1* | 1/2017 | Suzuki | H04W 72/042 |
| 2017/0048885 A1* | 2/2017 | Lampinen | H04W 4/70 |
| 2018/0083806 A1* | 3/2018 | Xing | H04W 28/0236 |
| 2018/0123765 A1* | 5/2018 | Cao | H04L 1/1614 |
| 2018/0176847 A1* | 6/2018 | Fasil Abdul | H04W 72/085 |
| 2018/0176945 A1* | 6/2018 | Cao | H04L 1/1864 |
| 2018/0219649 A1* | 8/2018 | Ying | H04L 1/1816 |
| 2018/0279327 A1* | 9/2018 | Ying | H04W 72/0446 |
| 2018/0295651 A1* | 10/2018 | Cao | H04W 72/042 |
| 2019/0053211 A1* | 2/2019 | Ying | H04W 72/044 |
| 2019/0230691 A1* | 7/2019 | Cao | H04L 1/1816 |

OTHER PUBLICATIONS

International Search Report and Written Opinion—PCT/US2018/051551—ISA/EPO—dated Dec. 11, 2018.
Mediatek Inc: "Analysis of (E)PDCCH Enhancements and Timing Relationship with POSCH", 3GPP Draft; R1-134444 Analysis of (E)PDCCH Enhancements and Timing Relationship with POSCH, 3rd Generation Partnership Project (3GPP), Mobile Competence Centre, 650, Route Des Lucioles, F-86921 SOPH, vol. RAN WG1, No. Guangzhou, Oct. 7, 2013-Oct. 11, 2013,Sep. 28, 2013 (Sep. 28, 2013), XP050717561, 4 Pages, Retrieved from the Internet: URL:http://www.3gpp.org/ftp/tsg ran/WG1 RL1/TSGR1 74b/Docs/ [retrieved on Sep. 28, 2013].

* cited by examiner

PHYSICAL DOWNLINK CONTROL CHANNEL RETRANSMISSION FOR ULTRA-RELIABLE LOW-LATENCY COMMUNICATIONS

CROSS REFERENCES

The present Application for Patent claims the benefit of U.S. Provisional Patent Application No. 62/560,625 by LI, et al., entitled "PHYSICAL DOWNLINK CONTROL CHANNEL RETRANSMISSION FOR ULTRA-RELIABLE LOW-LATENCY COMMUNICATIONS," filed Sep. 19, 2017, assigned to the assignee hereof, and expressly incorporated herein by its entirety.

BACKGROUND

The following relates generally to wireless communication, and more specifically to physical downlink control channel (PDCCH) retransmission for ultra-reliable low latency communications (URLLC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may be configured to support a base station transmitting control and data information to a UE. The control information may be transmitted in a physical downlink control channel (PDCCH) and may include a grant identifying resources within a physical downlink shared channel (PDSCH) that have been allocated to transport the data information for the UE. The UE may process the grant, identify resources within the PDSCH allocated to the UE by the grant, and attempt to decode the data information from the allocated PDSCH resources.

A transmission from the base station, however, may encounter interference and/or noise due to a variety of sources, e.g., communications from neighboring base station(s) or other sources of wireless transmissions. Interference and/or noise may degrade the performance of downlink (and uplink) communications, which may result in the UE not receiving and/or being unable to decode the control and/or data information. In conventional systems, a UE may request a retransmission of the data information and/or a base station may retransmit the data information after determining that the UE did not acknowledge receipt of previously transmitted data information within a specified amount of time. Requesting retransmission and/or determining that a UE did not acknowledge receipt of previously transmitted data information, however, may take time due to propagation and/or processing delays at the UE and/or base station, and may result in latency that is unacceptable in a wireless communication system where high reliability and low latency are required.

SUMMARY

Generally, the described techniques provide for sending a repetition of grants to a user equipment (UE). In some aspects, the described techniques expand transmission of control information in the time domain to improve the reliability of communicating control information. A base station may select between multiple different grant repetition configurations and transmit multiple instances of a grant in accordance with the selected configuration. The control information (e.g., physical downlink control channel (PDCCH) information) may include a grant that identifies resources of a shared data channel allocated for communicating data information (e.g., physical downlink shared channel (PDSCH) information) to a UE. To inform the UE of the selected configuration, the base station may generate and communicate a grant repetition parameter indicative of, or otherwise corresponding to, the selected grant repetition configuration.

The UE may receive and process the grant repetition parameter to determine which grant repetition configuration the base station will use for repeated transmissions of the grant. The base station may then repeat the transmission of the grant to the UE in accordance with the selected grant repetition configuration, and, based on the UE determining the repetition configuration, the UE will know where and when to monitor a control channel (e.g., a PDCCH) for repetitions of the grant. The UE may receive and decode one or more transmissions of the grant to identify resources allocated to the UE within a shared data channel that transport the data information. In some aspects, retransmission of multiple instances of the grant during different transmission time intervals (TTIs) may enable the UE to collect power over the multiple TTIs to use for soft combining, or other suitable techniques.

A method of wireless communication is described. The method may include receiving a grant repetition parameter from a base station, determining a grant repetition configuration corresponding to the grant repetition parameter, and monitoring for a repetition of grants corresponding to the determined grant repetition configuration.

An apparatus for wireless communication is described. The apparatus may include means for receiving a grant repetition parameter from a base station, means for determining a grant repetition configuration corresponding to the grant repetition parameter, and means for monitoring for a repetition of grants corresponding to the determined grant repetition configuration.

Another apparatus for wireless communication is described. The apparatus may include a processor, memory in electronic communication with the processor, and instructions stored in the memory. The instructions may be operable to cause the processor to receive a grant repetition parameter from a base station, determine a grant repetition configuration corresponding to the grant repetition parameter, and monitor for a repetition of grants corresponding to the determined grant repetition configuration.

A non-transitory computer readable medium for wireless communication is described. The non-transitory computer-readable medium may include instructions operable to cause a processor to receive a grant repetition parameter from a base station, determine a grant repetition configuration corresponding to the grant repetition parameter, and monitor for a repetition of grants corresponding to the determined grant repetition configuration.

In some examples of the method, apparatus, and non-transitory computer-readable medium described above, each grant in the repetition of grants has a different offset value and indicates same resources allocated for a shared data channel in a same transmission time interval (TTI). In some examples of the method, apparatus, and non-transitory computer-readable medium described above may further include processes, features, means, or instructions for receiving a first grant of the repetition of grants, decoding the first grant based at least in part on the grant petition parameter, and decoding the shared data channel corresponding to the decoded first grant.

In some examples of the method, apparatus, and non-transitory computer-readable medium described above may further include processes, features, means, or instructions for skipping decoding of a second grant of the repetition of grants based at least in part on determining that decoding the first grant is successful.

In some examples of the method, apparatus, and non-transitory computer-readable medium described above, the grant repetition configuration indicates a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants, and may further include processes, features, means, or instructions for monitoring for the respective grants at the resources based at least in part on the relationship. In some examples of the method, apparatus, and non-transitory computer-readable medium described above may further include processes, features, means, or instructions for performing soft combining during decoding of the prior grant and the subsequent grant of the repetition of grants to identify a same resource allocated for a shared data channel in each of a first transmission time interval (TTI) and a second TTI, and performing soft combining during decoding of the shared data channel. In some examples of the method, apparatus, and non-transitory computer-readable medium described above may further include processes, features, means, or instructions for decoding the prior grant to identify a first resource allocated for a first shared data channel in a first transmission time interval (TTI) and the subsequent grant to identify a second resource allocated for a second shared data channel in a second TTI, and decoding the first shared data channel corresponding to the first resource and the second shared data channel corresponding to the second resource In some examples of the method, apparatus, and non-transitory computer-readable medium described above, monitoring for the repetition of grants may further include receiving a grant corresponding to the determined grant repetition configuration, and decoding a shared data channel based at least in part on the received grant. In some examples of the method, apparatus, and non-transitory computer-readable medium described above, monitoring for the repetition of grants comprises: receiving a grant corresponding to the determined grant repetition configuration. Some examples of the method, apparatus, and non-transitory computer-readable medium described above may further include processes, features, means, or instructions for decoding a downlink shared data channel based at least in part on the received grant.

In some examples of the method, apparatus, and non-transitory computer-readable medium described above, monitoring for the repetition of grants comprises: monitoring for the repetition of grants in a plurality of transmission time intervals, wherein each grant of the repetition of grants identifies resources allocated to the UE within a shared data channel of a transmission time interval.

In some examples of the method, apparatus, and non-transitory computer-readable medium described above, a first grant of the repetition of grants identifies resources allocated to the UE within a downlink shared data channel of a transmission time interval that occurs prior to a transmission time interval of the first grant.

Some examples of the method, apparatus, and non-transitory computer-readable medium described above may further include processes, features, means, or instructions for buffering a plurality of symbols that may be received in a transmission time interval prior to a transmission time interval of a first grant of the repetition of grants. Some examples of the method, apparatus, and non-transitory computer-readable medium described above may further include processes, features, means, or instructions for determining that the plurality of symbols include downlink data allocated to the UE in the first grant. Some examples of the method, apparatus, and non-transitory computer-readable medium described above may further include processes, features, means, or instructions for decoding the plurality of symbols based at least in part on the first grant.

Some examples of the method, apparatus, and non-transitory computer-readable medium described above may further include processes, features, means, or instructions for performing soft combining during decoding of the repetition of grants.

Some examples of the method, apparatus, and non-transitory computer-readable medium described above may further include processes, features, means, or instructions for determining that each of the repetition of grants may be transmitted within the same frequency resources in different transmission time intervals based at least in part on the grant repetition configuration.

In some examples of the method, apparatus, and non-transitory computer-readable medium described above may further include processes, features, means, or instructions for determining that data corresponding to the repetition of grants is transmitted within a shared data channel of a transmission time interval based at least in part on the grant repetition configuration. Some examples of the method, apparatus, and non-transitory computer-readable medium described above may further include processes, features, means, or instructions for determining that data corresponding to the repetition of grants may be transmitted within a downlink shared data channel of a transmission time interval based at least in part on the grant repetition configuration.

In some examples of the method, apparatus, and non-transitory computer-readable medium described above may further include processes, features, means, or instructions for determining that data corresponding to the repetition of grants is transmitted within a shared data channel of each of a plurality of transmission time intervals based at least in part on the grant repetition configuration. Some examples of the method, apparatus, and non-transitory computer-readable medium described above may further include processes, features, means, or instructions for determining that data corresponding to the repetition of grants may be transmitted within a downlink shared data channel of each of a plurality of transmission time intervals based at least in part on the grant repetition configuration.

Some examples of the method, apparatus, and non-transitory computer-readable medium described above may further include processes, features, means, or instructions for performing soft combining during decoding of the repetition of grants based at least in part on the grant repetition configuration indicating a coding technique applied to the repetition of grants.

Some examples of the method, apparatus, and non-transitory computer-readable medium described above may further include processes, features, means, or instructions for performing soft combining during decoding of the repetition of grants based at least in part on the grant repetition configuration indicating a scrambling technique applied to a first grant of the repetition of grants.

Some examples of the method, apparatus, and non-transitory computer-readable medium described above may further include processes, features, means, or instructions for processing the grant repetition parameter to identify the grant repetition configuration from a plurality of different grant repetition configurations for receiving repeated grants in the time domain.

In some examples of the method, apparatus, and non-transitory computer-readable medium described above, a first grant of the repetition of grants identifies resources allocated to the UE within a shared data channel of a transmission time interval that occurs prior to a transmission time interval of the first grant. In some examples of the method, apparatus, and non-transitory computer-readable medium described above may further include processes, features, means, or instructions for buffering a plurality of symbols that are received in a transmission time interval prior to a transmission time interval of a first grant of the repetition of grants, determining that the plurality of symbols include downlink data allocated to the UE in the first grant, and decoding the plurality of symbols based at least in part on the first grant.

A method of wireless communication is described. The method may include identifying a first grant repetition configuration of a plurality of grant repetition configurations for a UE, generating a grant repetition parameter corresponding to the first grant repetition configuration, transmitting the grant repetition parameter to the UE to indicate the first grant repetition configuration, and transmitting a repetition of grants in accordance with the first grant repetition configuration.

An apparatus for wireless communication is described. The apparatus may include means for identifying a first grant repetition configuration of a plurality of grant repetition configurations for a UE, means for generating a grant repetition parameter corresponding to the first grant repetition configuration, means for transmitting the grant repetition parameter to the UE to indicate the first grant repetition configuration, and means for transmitting a repetition of grants in accordance with the first grant repetition configuration.

Another apparatus for wireless communication is described. The apparatus may include a processor, memory in electronic communication with the processor, and instructions stored in the memory. The instructions may be operable to cause the processor to identify a first grant repetition configuration of a plurality of grant repetition configurations for a UE, generate a grant repetition parameter corresponding to the first grant repetition configuration, transmit the grant repetition parameter to the UE to indicate the first grant repetition configuration, and transmit a repetition of grants in accordance with the first grant repetition configuration.

A non-transitory computer readable medium for wireless communication is described. The non-transitory computer-readable medium may include instructions operable to cause a processor to identify a first grant repetition configuration of a plurality of grant repetition configurations for a UE, generate a grant repetition parameter corresponding to the first grant repetition configuration, transmit the grant repetition parameter to the UE to indicate the first grant repetition configuration, and transmit a repetition of grants in accordance with the first grant repetition configuration.

In some examples of the method, apparatus, and non-transitory computer-readable medium described above, each grant in the repetition of grants has a different offset value and indicates same resources allocated for a shared data channel in a same transmission time interval (TTI). In some examples of the method, apparatus, and non-transitory computer-readable medium described above, the first grant repetition configuration indicates a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants.

In some examples of the method, apparatus, and non-transitory computer-readable medium described above, each grant of the repetition of grants identifies resources allocated to the UE within a shared data channel of a transmission time interval.

In some examples of the method, apparatus, and non-transitory computer-readable medium described above, a first grant of the repetition of grants identifies resources allocated to the UE within a shared data channel of a transmission time interval that occurs prior to a transmission time interval of the first grant. In some examples of the method, apparatus, and non-transitory computer-readable medium described above, a first grant of the repetition of grants identifies resources allocated to the UE within a downlink shared data channel of a transmission time interval that occurs prior to a transmission time interval of the first grant.

In some examples of the method, apparatus, and non-transitory computer-readable medium described above, transmitting the repetition of grants includes transmitting each grant of the repetition of grants within the same frequency resources in respective transmission time intervals in accordance with the first grant repetition configuration.

Some examples of the method, apparatus, and non-transitory computer-readable medium described above may further include processes, features, means, or instructions for transmitting data corresponding to the repetition of grants within a shared data channel of a transmission time interval. Some examples of the method, apparatus, and non-transitory computer-readable medium described above may further include processes, features, means, or instructions for transmitting data corresponding to the repetition of grants within a downlink shared data channel of a transmission time interval.

Some examples of the method, apparatus, and non-transitory computer-readable medium described above may further include processes, features, means, or instructions for transmitting data corresponding to the repetition of grants within a shared data channel in each of the transmission time intervals. Some examples of the method, apparatus, and non-transitory computer-readable medium described above may further include processes, features, means, or instructions for transmitting data corresponding to the repetition of grants within a downlink shared data channel in each of the transmission time intervals.

Some examples of the method, apparatus, and non-transitory computer-readable medium described above may further include processes, features, means, or instructions for determining that grants of the repetition of grants differ by at least one bit. Some examples of the method, apparatus, and non-transitory computer-readable medium described above may further include processes, features, means, or instructions for applying a coding technique to generate the grants.

Some examples of the method, apparatus, and non-transitory computer-readable medium described above may further include processes, features, means, or instructions for determining that grants of the repetition of grants differ by at least one bit. Some examples of the method, apparatus, and non-transitory computer-readable medium described above may further include processes, features, means, or instructions for applying a scrambling technique to a first grant of the grants.

In some examples of the method, apparatus, and non-transitory computer-readable medium described above, generating the grant repetition parameter comprises: generating the grant repetition parameter to identify the first grant repetition configuration of a plurality of different grant repetition configurations for sending repeated grants in the time domain.

DETAILED DESCRIPTION

Figure 1:
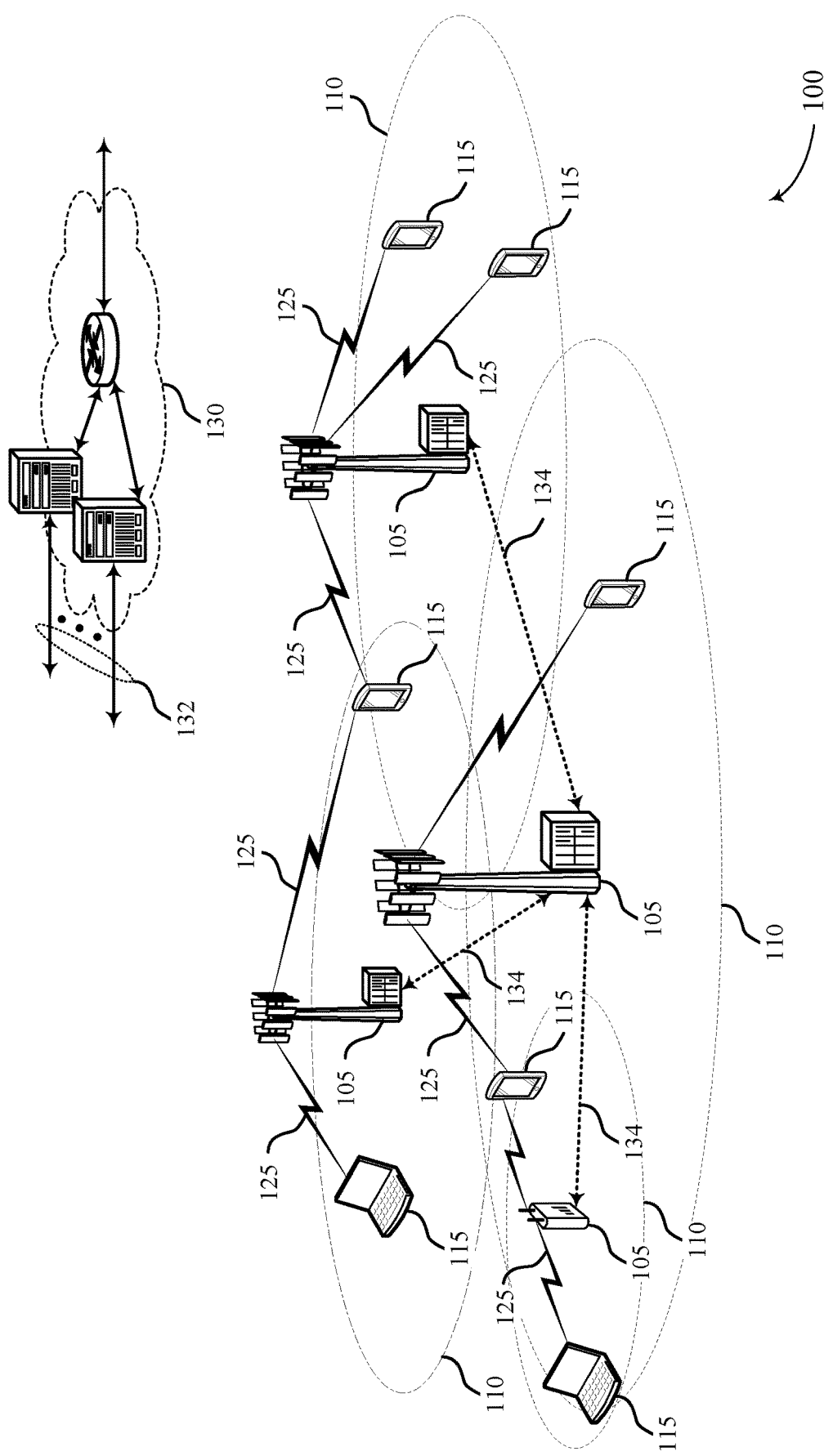
FIG. 1 illustrates an example of a system for wireless communication that supports PDCCH retransmission for URLLC in accordance with aspects of the present disclosure.

Wireless communication systems may be configured where a base station transmits a repetition of grants that respectively identify resources of a shared data channel allocated for communicating data information to a UE. The UE may monitor and decode a control channel (e.g., physical downlink control channel (PDCCH)) to recover and process a grant to determine when and where the data information being communicated to the UE occurs within a shared data channel (e.g., a physical downlink shared channel (PDSCH)). In conventional solutions, if the UE fails to receive a grant, the UE may also not receive data information corresponding to the grant and therefore may not acknowledge receipt of the data information. If not acknowledged within a specified amount of time, the base station may subsequently schedule retransmission of the data information. While this technique may be acceptable for certain types of communications, such delays and loss of communications may be unacceptable in other communication types. For example, ultra-reliable low-latency communications (URLLC), mission critical (MiCR) communications, vehicle-based communications, and the like, have associated latency specifications and/or maximum allowable error rates (e.g., $10^{-5}$ error rate within 1 ms delay) that may not be met when using these conventional techniques.

Conventional attempts to resolve such issues by increasing an aggregation level (AL). Increasing the AL may increase the amount of available resources allocated to transmit control information to improve the chance that the UE receives a grant, but comes at a cost in terms of reducing the amount of available resources that are left for communicating the data information. For example, a base station and a UE may communicate in transmission time intervals (TTIs) that correspond to a defined bandwidth and each have a defined duration in time. A TTI may include a finite set of available control channel elements (CCEs) and using more CCEs to transmit a grant leaves fewer CCEs available for communicating data information. Another approach has been to increase a power level used for transmitting a grant. Again, this may improve reliability due to a higher received power level at the UE, but at a cost of less available transmit power for the transmitting the data information, e.g., in a wireless communication system with a peak-to-average power ratio (PAPR) limitation.

Aspects of the disclosure are initially described in the context of a wireless communications system. In some aspects, a base station may expand PDCCH retransmissions in the time domain to improve reliability by, in some instances, transmitting a repetition of grants in accordance with a grant repetition configuration signaled to a UE. In an example, a base station may communicate using short or mini-slots (e.g., one, two, three, four symbol periods), which may also be referred to as transmission time intervals (TTIs), where a control channel (e.g., PDCCH) carrying the grant is transmitted in multiple TTIs. In some instances, the UE may use soft combining techniques to improve decoding of the grant. A base station may identify or otherwise select a grant repetition configuration to use for transmitting to the UE a repetition of grants. The base station may transmit to the UE a parameter that is associated with, indicative of, or otherwise corresponds to the selected grant repetition configuration.

The UE may receive the parameter and use it to identify or otherwise determine which grant repetition configuration the base station will be using to convey the repetition of grants. The UE may then monitor for the repetition of grants that the base station transmits in accordance with the grant repetition configuration. Repetition of transmissions of the grant may improve the chances that the UE successfully receives and decodes a grant identifying resources of a shared data channel allocated to the UE. This technique may improve the likelihood of communications between a base station and a UE to comply with low error rate and low latency specifications.

Aspects of the disclosure are further illustrated by and described with reference to apparatus diagrams, system diagrams, and flowcharts that relate to PDCCH retransmission for URLLC.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing multicarrier modulation (MCM) techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.)

at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may identify a first grant repetition configuration of a plurality of grant repetition configurations for a UE 115. The base station 105 may generate a grant repetition parameter corresponding to the first grant repetition configuration. The base station 105 may transmit the grant repetition parameter to the UE 115 to indicate the first grant repetition configuration. The base station 105 may transmit a repetition of grants in accordance with the first grant repetition configuration. In some cases, each grant in the repetition of grants may have a different offset value and indicate same resources allocated for a shared data channel in a same transmission time interval (TTI). In some cases, the first grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants.

A UE 115 may receive a grant repetition parameter from a base station 105. The UE 115 may determine a grant repetition configuration corresponding to the grant repetition parameter. The UE 115 may monitor for a repetition of grants corresponding to the determined grant repetition configuration. In some cases, the UE 115 may be configured with a plurality of grants of the repetition of grants and each grant has a different offset value and corresponds to same resources allocated for a shared data channel in a same TTI. Such multiple transmission of the grants at different offset values may improve control reliability for the UE 115 since the UE 115 is provided with multiple opportunities to receive a grant of the repetition of the grants. Thus, even if the UE 115 does not receive a first grant of the repetition of the grants, the UE 115 may still receive a second grant, a third grant, etc., of the repetition of grants and be able to decode the shared data channel based on a decoded grant. Further, the different offset values may include an offset value in a subsequent TTI than the TTI during which the shared data channel is transmitted. Thus, the UE 115 may be able to decode the shared data channel transmitted in a prior TTI based on the second grant received in a subsequent TTI, thereby increasing the control reliability even further.

In some cases, a UE 115 may receive a grant repetition configuration that indicates a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants. In such cases, the UE 115 may monitor for the respective grants at the resources based at least in part on the relationship. In such cases, the payloads of the prior grant and the subsequent grant may be redundant or same, and the UE 115 may perform soft combining of the prior grant and the subsequent grant. Thus, even if decoding of the prior grant is not successful, the UE 115 may still keep and use the information included in the prior grant for decoding the subsequent grant and/or the shared data channel, thereby reducing the resource and power consumption by the UE 115. In addition, the UE 115 may be configured with a same shared data channel transmitted in multiple TTIs during which the prior grant and the subsequent grant are transmitted. Such multiple transmissions of the shared data channel may improve control and data reliability for the UE 115 since the UE 115 may have an increased opportunity to receive and decode a grant out of the plurality of grants and to decode the shared data channel transmitted within the same TTI during which the grant is received without having to search for the shared data channel in another TTI.

Figure 2:
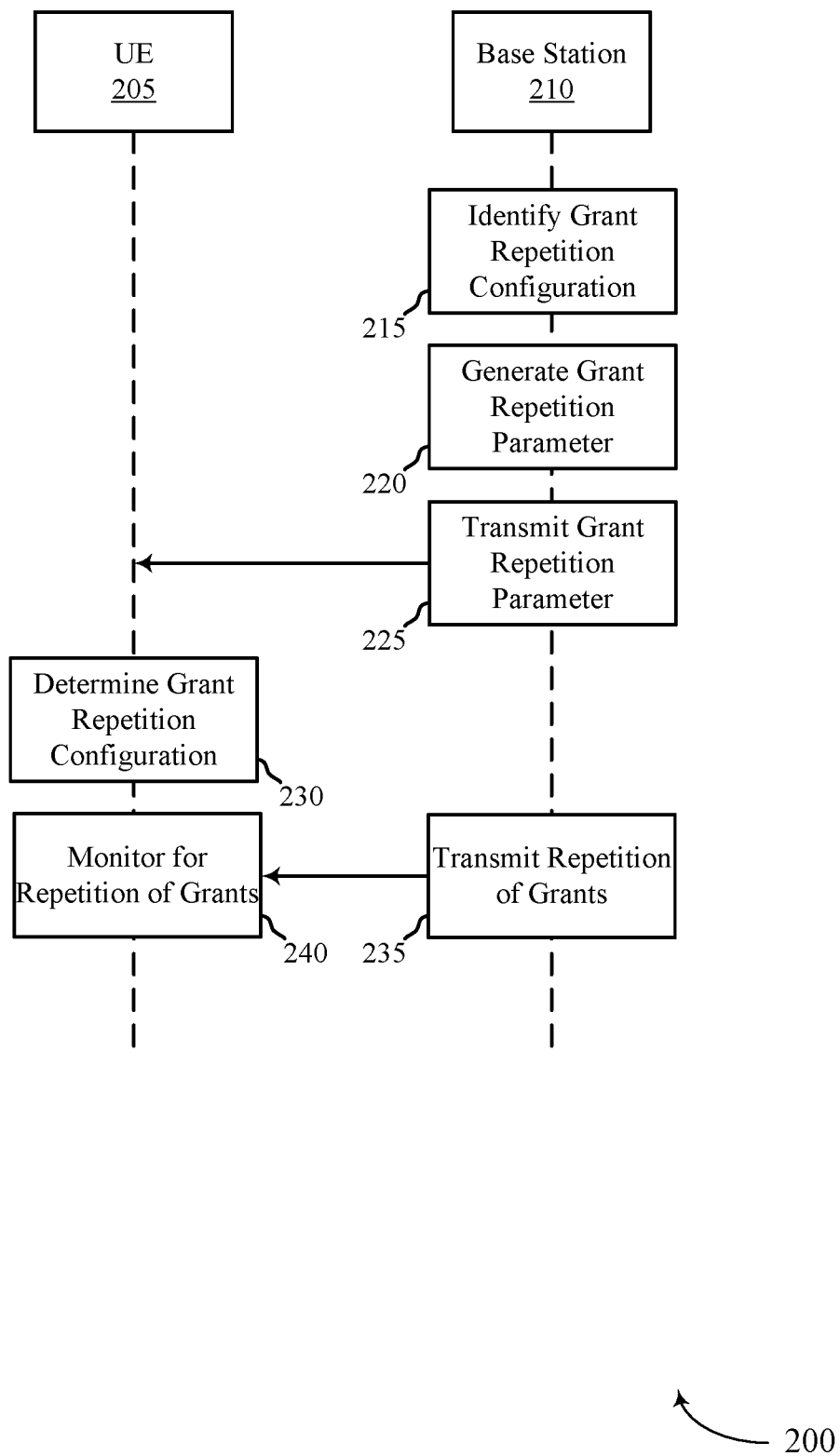
FIG. 2 illustrates an example of a process that supports PDCCH retransmission for URLLC in accordance with aspects of the present disclosure.

FIG. 2 illustrates an example of a process 200 that supports PDCCH retransmission for URLLC in accordance with various aspects of the present disclosure. In some examples, process 200 may implement aspects of wireless communication system 100. Process 200 may include a UE 205 and a base station 210, which may be examples of the corresponding device described herein. Broadly, process 200 illustrates one example of a base station generating and indicating a parameter to the UE 205 that corresponds to a grant repetition configuration to be used to multiple transmissions of a grant to the UE 205.

At 215, the base station 210 may identify a first grant repetition configuration of a plurality of different grant repetition configurations for transmitting a repetition of grants to UE 205. In some cases, each grant in the repetition of grants may have a different offset value (e.g., each grant has a different K0 value) and indicates same resources allocated for a shared data channel in a same transmission time interval (TTI). In some cases, the first grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants.

At 220, the base station 210 may generate a grant repetition parameter that corresponds to the first grant repetition configuration. In some aspects, the base station 210 may generate the grant repetition parameter in order to identify the first grant repetition configuration of a plurality of different grant repetition configurations for sending repeated grants in the time domain. For example, the grant repetition parameter may be used to select between the grant repetition configurations described below in FIGS. 3-5. The base station 210 may, for example, indicate in the grant repetition parameter that the grant repetition configuration of FIG. 3, or FIG. 4A, or FIG. 4B, or FIG. 5, is being used, and the UE 205 may monitor for a repetition of grants in accordance with the grant repetition configuration indicated in the grant repetition parameter. The grant repetition parameter may be one or more bits or a field that the base station 210 communicates to the UE 215 semi-statically, e.g., in a signal, and/or dynamically, e.g., in downlink control information (DCI). For example, the grant repetition parameter may be an index into a table of configurations. The UE 205 may use the index to identify from the table which of the grant repetition configurations to use for monitoring for a repetition of grants (e.g., monitor for grants in accordance with grant repetition configuration of FIG. 3, instead of the grant repetition configurations shown in FIG. 4A, or FIG. 4B, or FIG. 5). In another example, the grant repetition parameter may be a value from which the UE 115 may calculate to apply a particular one of the grant repetition configurations (e.g., monitor for grants in accordance with the grant repetition configuration of FIG. 5, instead of the grant repetition configurations shown in FIG. 3, FIG. 4A, or FIG. 4B).

At 225, the base station 210 may transmit (and the UE 205 may receive) the grant repetition parameter to the UE 205 to indicate the first grant repetition configuration.

At 230, the UE 205 may determine the first grant repetition configuration corresponding to the grant repetition parameter.

At 235, the base station 210 may transmit (and at 240 the UE 205 may monitor for and receive) a repetition of grants corresponding to the first grant repetition configuration. In some aspects, each grant in the repetition of grants may identify resource(s) allocated to the UE 205 within a shared data channel (e.g., a PDSCH or PUSCH) within a TTI. In some cases, the UE 205 may decode a first grant based on the grant repetition parameter, and decode the shared data channel corresponding to the decoded first grant. In some cases, the UE 205 may skip decoding of a second grant of the repetition of grants based on determining that decoding the first grant is successful. In some aspects, at least one grant of the repetition of grants may identify resource(s) allocated to the UE 205 within a downlink shared data channel of a TTI that occurs prior to a TTI of the first grant, e.g., the control region 305 of the third TTI 330 in FIG. 3. Accordingly, the UE 205 may buffer a plurality of symbols that are received in one or more TTIs received prior to the TTI of the first grant of the repetition of the grants. The UE 205 may process a control region of a later received TTI to identify a grant that allocates to the UE 205 one or more of symbols of a previous TTI and decode data from the one or more symbols according to the grant.

In some aspects, the base station 210 may determine that the grants in the repetition of grants are not the same, e.g., differ by at least one bit. Accordingly, the base station 210 may apply a coding technique to generate the grants to permit soft combining of received grants that differ by at least one bit. In some examples, the base station 210 may apply a scrambling technique to at least one grant of the repetition of grants to scramble one or more bits to carry offset information. In some aspects, the base station 210 may transmit data corresponding to the repetition of grants within a downlink shared data channel of a TTI and/or of each TTI.

In some aspects, the grant repetition configuration indicates a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants. In such cases, the UE 205 may monitor for the respective grants at the resources based at least in part on the relationship.

In some aspects, the UE 205 may apply soft combining during decoding of the repetition of grants. In such cases, the UE 205 may perform soft combining during decoding of the prior grant and the subsequent grant of the repetition of grants to identify a same resource allocated for a shared data channel in each of a first TTI and a second TTI, and perform soft combining during decoding of the shared data channel. In some aspects, the UE 205 may determine not to perform soft combining, and decode the prior grant to identify a first resource allocated for a first shared data channel in a first TTI and the subsequent grant to identify a second resource allocated for a second shared data channel in a second TTI, and decode the first shared data channel corresponding to the first resource and the second shared data channel corresponding to the second resource.

In some aspects, the UE 205 may determine that each grant of the repetition of grants is transmitted within the same frequency resources (e.g., using the same set of channels) in different TTIs. The UE 205 may determine that data corresponding to the repetition of grants is transmitted in a downlink shared data channel of each of the TTIs based on the grant repetition configuration. The UE 205 may determine that data corresponding to the repetition of grants is transmitted within a downlink shared data channel of each of a plurality of TTIs based at least in part on the grant repetition configuration.

Figure 3:
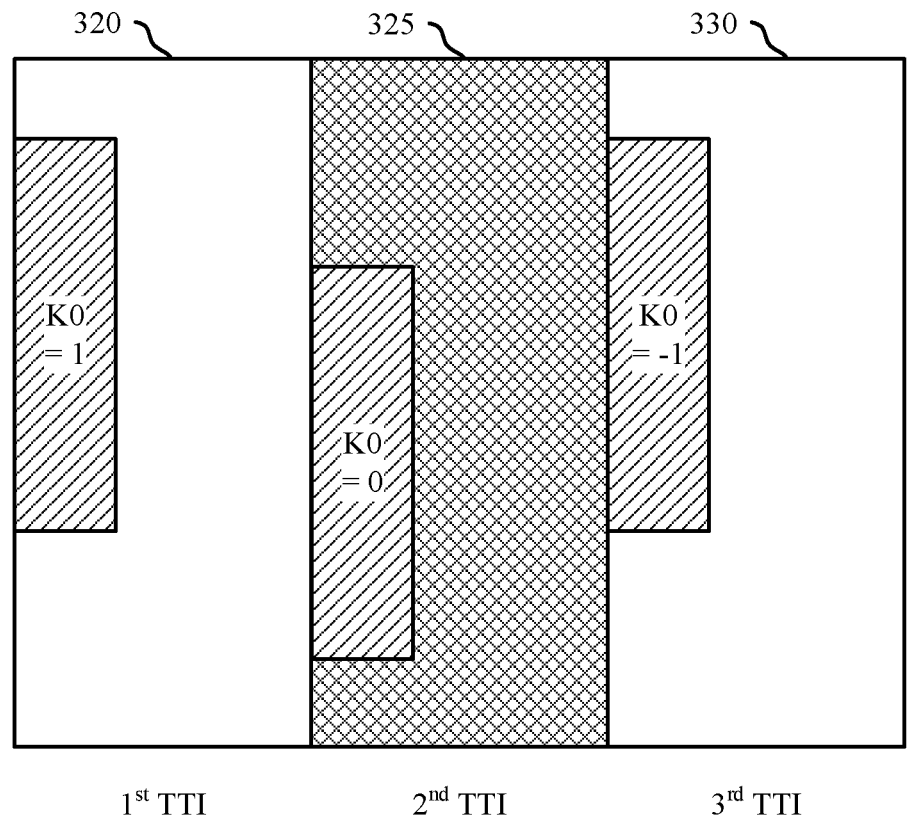
FIG. 3 illustrates an example of a grant repetition configuration that supports PDCCH retransmission for URLLC in accordance with aspects of the present disclosure.

FIG. 3 illustrates an example of a grant repetition configuration 300 that supports PDCCH retransmission for URLLC in accordance with various aspects of the present disclosure. In some examples, grant repetition configuration 300 may implement aspects of wireless communication system 100 and/or process 200. Aspects of grant repetition configuration 300 may be implemented by a UE 115 and/or a base station 105, which may be examples of the corresponding device described herein. Broadly, grant repetition configuration 300 illustrates one example of a base station selecting and indicating a parameter to a UE that indicates multiple PDCCH grants are being transmitted at different times to grant the same PDSCH resource to the UE 115. In some aspects, each grant in the repetition of grants may have a different offset value and indicates same resources allocated for a shared data channel in a same transmission time interval (TTI). In some cases, the first grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants.

Grant repetition configuration 300 may include three TTIs 320, 325, and 330. In other examples, the techniques described herein may be implemented using two or more TTIs. Each TTI may refer to a slot, a mini-slot, and the like. Each TTI may span a number of symbol periods in the time domain and a number of carriers in the frequency domain. In some examples, each TTI may be a mini-slot having 1-4 symbol periods. Each TTI may be divided into a control region 305, a data region 310, and an "other" region 315. The control region 305 may be used to carry or otherwise convey control information to UE(s) operating within the coverage area of a base station. The control information may include a grant of resources in the data region 310 for the UE 115. The data region 310 may carry or otherwise convey data information for the UE 115 using resources allocated in the grant. In some aspects, the data region 310 may be a shared data channel, such as a PDSCH or a PUSCH. The "other" region 315 may refer to resources that are either unused or are associated with resources allocated using other grants (e.g., grants other than the grants described in the context of the present disclosure).

The number of subcarriers (or tones or frequencies) occupying the TTI may establish the system bandwidth. In one example, the system bandwidth may include 12 subcarriers, or some other number of subcarriers. As discussed above, an intersection of one subcarrier occurring during one symbol period may constitute a resource element (RE) and the control information may be carried in one or more CCEs (e.g., REs forming one or more resource element groups (REGs), and REGs forming one or more CCE(s)).

In some aspects, a base station 105 may select or otherwise identify a grant repetition configuration to use for the UE 115. For example, the base station 105 may have multiple grant repetition configurations to choose from and identify at least one configuration to use for communicating a grant to the UE 115 based on a metric associated with the communications with the UE 115 (e.g., priority level, acceptable latency, acceptable error rates, etc.), based on channel conditions (e.g., congestion levels, interference levels, and the like, etc.). The base station 105 may generate a parameter that corresponds to the selected grant repetition configuration, e.g., a grant repetition parameter that is associated with the selected grant repetition configuration. The grant repetition parameter may be one or more bits or a field that the base station 105 communicates to the UE 115 semi-statically, e.g., in a signal, and/or dynamically, e.g., in downlink control information (DCI). For example, the grant repetition parameter may be an index into a table of configurations, and the UE 205 may use the index to determine from the table to monitor for grants in accordance with the grant repetition configuration 300 (e.g., instead of the grant repetition configurations shown in FIG. 4A, or FIG. 4B, or FIG. 5). In another example, the grant repetition parameter may be a value from which the UE 115 may calculate to determine to apply grant repetition configuration 300 (e.g., instead of the grant repetition configurations shown in FIG. 4A, or FIG. 4B, or FIG. 5).

In some aspects, the control region 305 for each TTI may carry a grant of resources in the same PDSCH for the UE 115. For example, the control region 305 of the first TTI 320 may carry a grant of resources for the UE 115 for the data region 310 of the second TTI 325. The control region 305 of the second TTI 325 may carry a grant of the same resources for the UE 115, e.g., for the data region 310 of the second TTI 325. The control region 305 of the third TTI 330 may carry a grant of the same resources for the UE 115, e.g., for the data region 310 of the second TTI 325.

Each control region 305 may carry one or more "K0" bits or fields that generally refer to the difference in TTIs between when the grant is carried and when the corresponding data region 310 occurs. In some aspects, the K0 bits or fields may refer to one of the UE 115 processing times and may be defined as the time between the downlink grant and the associated downlink data transmission. The UE 115 may have other processing times, such as a "K1" bits or fields (e.g., the time between the downlink data transmission and the associated uplink acknowledgement) and a "K2" bits or fields (e.g., the time between an uplink grant and the associated uplink data transmission). Thus, K0=1 in the control region 305 of the first TTI 320 may indicate that the grant is for resources in the data region 310 of the second TTI 325 (e.g., in the next TTI). K0=0 in the control region 305 of the second TTI 325 may indicate that the grant is for resources in the data region 310 of the same TTI that includes the control region 305, e.g., the second TTI 325. K0=−1 in the control region 305 of the third TTI 330 may indicate that the grant is for resources in the data region 310 of the second TTI 325, e.g., in the preceding TTI. Thus, a UE 115 monitoring for repeated transmissions of the grant may store or otherwise buffer information communicated in one or more preceding TTIs until the UE 115 can decode the subsequent control region 305 to determine whether the preceding TTI(s) carried data information for the UE 115.

When the UE 115 decodes the control region 305 of the subsequent TTI and determines that the preceding TTI(s) carried data information for the UE 115, the UE 115 can recover and decode the buffered symbols from the preceding TTIs. Otherwise, the buffered symbols may be overwritten. In some aspects, a negative value for K0 may be used to point to a PDSCH occurring in an earlier symbol, e.g., TTI, (non-causal). The UE 115 can buffer the OFDM symbols in the earlier TTI, e.g., when the TTI is a mini-slot, the number of symbols to buffer may not be too large. In some examples, the UE 115 may be configured to buffer quite a few symbols to handle PDCCH/PDSCH reuse for slot based transmission.

Generally, the grant repetition configuration may include a pattern in which the base station 105 will repeat the transmission of the grant to the UE 115. In the example grant repetition configuration 300, the base station 105 may transmit the grant in the control region 305 during the first TTI 320 using a first set of carriers, in the control region 305 of the second TTI 325 using a second set of carriers, and in the control region 305 of the third TTI 330 using a third set of carriers. In some aspects, some or all of the first, second, and third sets of carriers may be the same carriers or may be different carriers. In FIG. 3, the second set of carriers are different from the first and third sets of carriers.

In some aspects, grant repetition configuration 300 may allow multiple PDCCH grants to be transmitted to a UE 115 at different times that allocate the same PDSCH in the same TTI to the UE 115. The UE 115 may miss one grant, but receive and decode at least one of the other one(s) and can therefore still receive the PDSCH. Different values for K0 may be used for different re-transmissions of the grant, so they point to the same PDSCH (e.g., data region 310 of the second TTI 325).

In some aspects, the (re-)transmitted grants may be hashed in a search space and the UE 115 may independently perform blind decoding of the search space attempting to decode a grant. In some aspects, this may not be a deterministic PDCCH retransmission, e.g., the base station 105 may not need to retransmit the grants in each TTI. In such cases, the UE 115 need not decode every grant in the repetition of the grants. For example, the UE 115 may receive a first grant (e.g., a grant received in the control region 305 of the first TTI or the second TTI) of the repetition of grants, decode the first grant based at least in part on the grant repetition parameter (e.g., decode resources allocated for transmitting the first grant during the control region 305 corresponding to the configuration indicated in the grant repetition parameter), and decode the shared data channel (e.g., data received during the data region 310 of the second TTI), corresponding to the decoded first grant. Then, the UE 115 may skip decoding of a second grant (e.g., a grant received during the control region 305 of the second TTI or the third TTI) of the repetition of grants based at least in part on determining that decoding the first grant is successful. As such, grant may be considered received if one of the transmissions is successfully decoded by the UE 115 and the corresponding data information is successfully decoded. If so, the base station 105 may refrain from transmitting additional instances of the grant during subsequent TTIs. Multiple attempts at transmitting the grant may increase the chance of the UE 115 successfully detecting the grant.

Figure 4A:
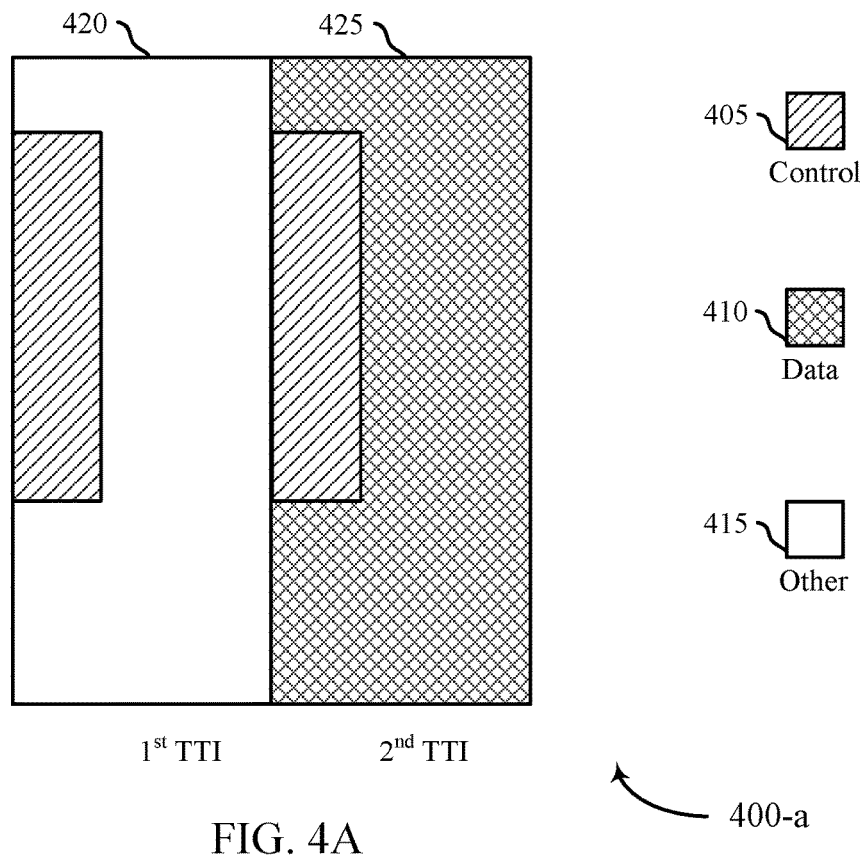
FIGS. 4A-B illustrate examples of grant repetition configurations that support PDCCH retransmission for URLLC in accordance with aspects of the present disclosure.
Figure 4B:
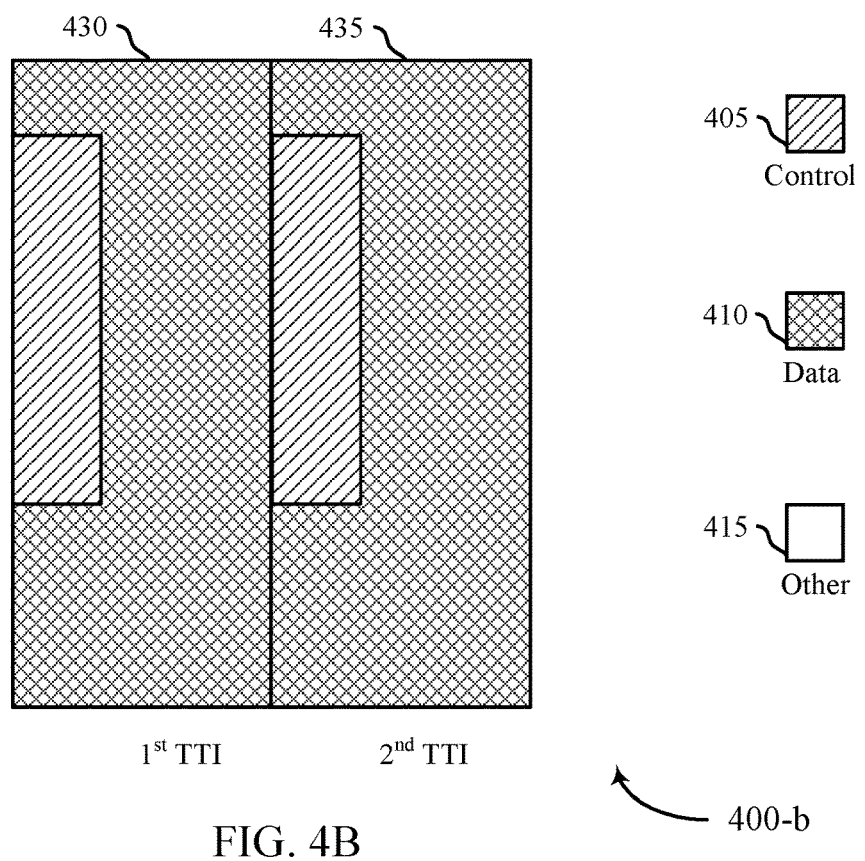

FIGS. 4A and 4B illustrate examples of a grant repetition configuration 400 that supports PDCCH retransmission for URLLC in accordance with various aspects of the present disclosure. In some examples, grant repetition configuration 400 may implement aspects of wireless communication system 100 and/or process 200. Aspects of grant repetition configuration 400 may be implemented by a UE 115 and/or a base station 105, which may be examples of the corresponding device described herein. Broadly, grant repetition configuration 400 illustrates one example of a base station 105 selecting and indicating a parameter to a UE 115 that indicates multiple PDCCH grants are being transmitted with a fixed timeline to grant the same PDSCH resource to the UE 115. In such example, the grant repetition configuration may indicate a relationship between resources that include respective grants of the repetition of grants, the relationship indicating a subsequent resource (e.g., time and/or frequency resources allocated for the UE 115 to receive a grant within the control region 405 of the second TTI) of the resources in which to monitor for a subsequent grant (e.g., a grant received during the control region 405 of the second TTI) of the repetition of grants based at least in part on a prior resource (e.g., time and/or frequency resources allocated for the UE 115 to receive a grant within the control region 405 of the first TTI) of the resources that includes a prior grant (e.g., a grant received during the control region 405 of the first TTI) of the repetition of grants. The UE 115 may monitor for the respective grants at the resources based at least in part on the relationship.

Grant repetition configuration 400-a may include two TTIs 420 and 425. In other examples, the techniques described herein may be implemented using two or more TTIs. For example, grant repetition configuration 400-a may be followed by two TTIs 430 and 435. Each TTI may refer to a slot, a mini-slot, and the like. Each TTI may span a number of symbol periods in the time domain and a number of carriers in the frequency domain, as is discussed above. In some examples, each TTI may be a mini-slot having 1-4 symbol periods. Each TTI may be divided into a control region 405, a data region 410, and an "other" region 415. The control region 405 may be used to carry or otherwise convey control information to UE(s) 115 operating within the coverage area of a base station 105. The control information may include a grant of resources in the data region 410 for the UE 115. The data region 410 may carry or otherwise convey data information for the UE 115 using the resources allocated in the grant. In some aspects, the data region 410 may be a shared data channel, such as a PDSCH or a PUSCH. The "other" region 415 may refer to resources that are either unused or are associated with resources allocated using other grants (e.g., grants other than the grants described in the context of the present disclosure).

The number of subcarriers (or tones or frequencies) occupying the TTI may establish the system bandwidth. In one example, the system bandwidth may include 12 subcarriers, or some other number of subcarriers. As discussed above, an intersection of one subcarrier occurring during one symbol period may constitute an RE and the control information may be carried in one or more CCEs (e.g., REs forming one or more REGs and REGs forming one or more CCE(s)).

Referring first to grant repetition configuration 400-a, the control region 405 for each TTI may carry a grant of the same PDSCH resource for the UE 115. For example, the control region 405 of the first TTI 420 may carry a grant of resources for the UE 115 for the data region 410 of the second TTI 425. The control region 405 of the second TTI 425 may carry a grant of the same resources for the UE 115, e.g., for the data region 410 of the second TTI 425. TDM retransmission of the grant in the control region 405 of multiple TTIs may allow the total transmit power to increase. That is, the total accumulated transmit power for the multiple grant transmissions over multiple TTIs may support the UE 115 by collecting power in the time domain using soft combining, when applicable, to decode the grant. In some aspects, the UE 115 may use soft combining using the control regions 405 of the first TTI 420 and the second TTI 425. For example, each control region 405 of the first and second TTIs may carry the same (or substantially similar) bits such that the UE 115 can use soft combining to combine the power across the time domain to decode the grant. In some examples, soft combining may refer to an error correction technique where received corrupted data is not discarded. For example, data packets that are not decoded are not discarded, but are stored in a "buffer," and combined with a next re-transmission.

Referring next to grant repetition configuration 400-b, the control regions 405 may carry grants that support PDSCH bundling. For example, the control region 405 of the first TTI 430 may carry a grant of resources for the UE 115 for the data region 410 of the first TTI 430. The control region 405 of the second TTI 435 may carry a grant of the resources for the data region 410 of the second TTI 435. In some aspects, mini-slot bundling may be helpful for low geometry UEs, e.g., UEs within a predefined range of the base station 105. Generally, the grants carried in the control region 405 of the first TTI 430 and the second TTI 435 may be the same, i.e., each grant may grant resources for both the first TTI 430 and the second TTI 435. The UE 115 may decode one or both grants and decode data information in accordance with resources of the data region 410 of both TTIs, e.g., by buffering the first TTI 430, specified in the decoded one or more grants. In some examples, the data information in each of TTIs 430, 435 may be the same.

In some aspects, a base station 105 may select or otherwise identify a grant repetition configuration to use for the UE 115. For example, the base station 105 may have multiple grant repetition configurations to choose from and identify at least one to use for communicating a grant to the UE 115 based on a metric associated with the communications with the UE 115, based on channel conditions, etc. The base station 105 may generate a parameter that corresponds to the selected grant repetition configuration, e.g., a grant repetition parameter that is associated with the selected grant repetition configuration. The grant repetition parameter may be one or more bits or a field that the base station 105 communicates to the UE 115 semi-statically, e.g., in an RRC signal, and/or dynamically, e.g., in a DCI.

Generally, the grant repetition configuration may include a pattern in which the base station 105 will repeat the transmission of the grant to the UE 115. In the example grant repetition configuration 400-a, the base station 105 may transmit the grant in the control region 405 during the first TTI 420 using the same set of carriers as are used in the control region 405 of the second TTI 425. In the example grant repetition configuration 400-b, the base station 105 may transmit the grant in the control region 405 during the first TTI 430 for the corresponding data region 410 of the first TTI 430 and the control region 405 of the second TTI 435 for the corresponding data region 410 of the second TTI 435. Accordingly, the UE 115 may receive and decode the control region 405 to detect the grant to identify resources of a shared data channel allocated for transporting data information to the UE 115. The UE 115 may use soft combining to decode the grant in the control region 405 and/or data region 410, e.g., by decoding the usable data and storing corrupted data until the next retransmission. The UE 115 may then use the corrupted data in combination with the subsequent retransmission of the data to successfully decode the PDSCH. In some aspects, the UE 115 may also use other error correction techniques to confirm that the grant is decoded successfully, e.g., a cyclic redundancy check (CRC), removing a mask from the grant that was applied based on an identifier of the UE 115, and the like.

In some cases, the UE 115 may perform separate decoding of the shared data channel received in the respective TTIs. For example, the UE 115 may determine the grant repetition configuration 400-b corresponds to the received grant repetition parameter from the base station 105. The UE 115 may decode a prior grant (e.g., a grant received during the control region 405 of the first TTI) to identify a first resource allocated for a first shared data channel in a first TTI (e.g., data region 410 in TTI 430) and a subsequent grant (e.g., a grant received during the control region 405 of the second TTI) to identify a second resource allocated for a second shared data channel in a second TTI (e.g., data region 410 in TTI 435). The UE 115 may separately decode the first shared data channel corresponding to the first resource in the first TTI and the second shared data channel corresponding to the second resource in the second TTI.

Figure 5:
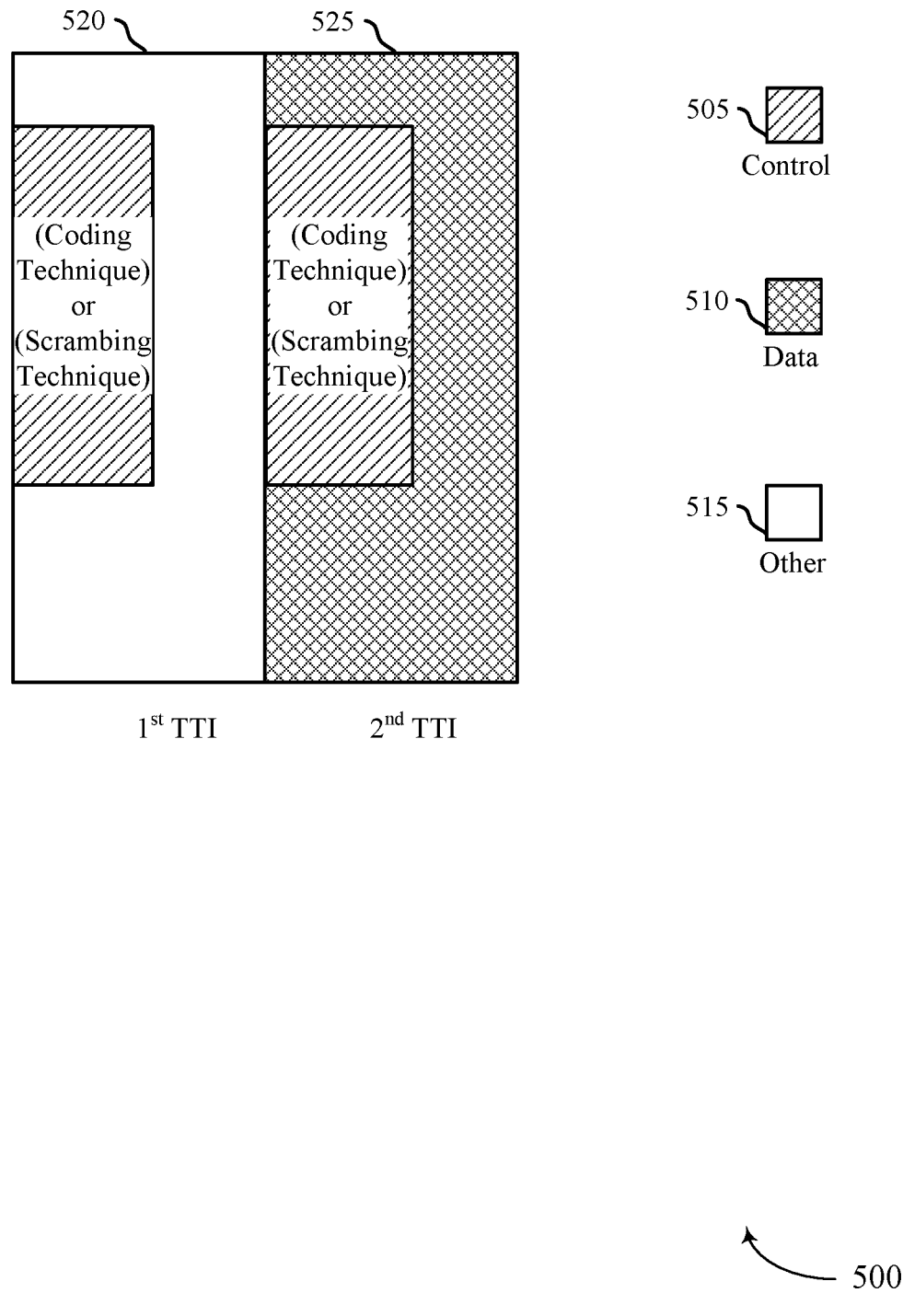
FIG. 5 illustrates an example of a grant repetition configuration that supports PDCCH retransmission for URLLC in accordance with aspects of the present disclosure.

FIG. 5 illustrates an example of a grant repetition configuration 500 that supports PDCCH retransmission for URLLC in accordance with various aspects of the present disclosure. In some examples, grant repetition configuration 500 may implement aspects of wireless communication system 100 and/or process 200. Aspects of grant repetition configuration 500 may be implemented by a UE 115 and/or a base station 105, which may be examples of the corresponding device described herein. Broadly, grant repetition configuration 500 illustrates one example of a base station 105 selecting and indicating a parameter to a UE 115 that indicates floating PDCCH grant retransmission with soft combining capability at the UE 115.

Grant repetition configuration 500 may include two TTIs 520 and 525. In other examples, the techniques described herein may be implemented using two or more TTIs. Each TTI may refer to a slot, a mini-slot, and the like. Each TTI may span a number of symbol periods in the time domain and a number of carriers in the frequency domain, as is discussed above. In some examples, each TTI may be a mini-slot having 1-4 symbol periods. Each TTI may be divided into a control region 505, a data region 510, and an "other" region 515. The control region 505 may be used to carry or otherwise convey control information to UE(s) operating within the coverage area of a base station. The control information may include a grant of resources in the data region 510 for the UE 115. The data region 510 may carry or otherwise convey data information for the UE 115 using the resources allocated in the grant. In some aspects, the data region 510 may be a shared data channel, such as a PDSCH or a PUSCH. The "other" region 515 may refer to resources that are either unused or are associated with resources allocated using other grants (e.g., grants other than the grants described in the context of the present disclosure).

The number of subcarriers (or tones or frequencies) occupying the TTI may establish the system bandwidth. In one example, the system bandwidth may include 12 subcarriers, or some other number of subcarriers. As discussed above, an intersection of one subcarrier occurring during one symbol period may constitute an RE and the control information may be carried in one or more CCEs (e.g., REs forming one or more REGs and REGs forming one or more CCE(s)).

In some aspects, the control region 505 for each TTI may carry a grant of the same PDSCH resource for the UE 115. For example, the control region 505 of the first TTI 520 may carry a grant of resources for the UE 115 for the data region 510 of the second TTI 525. The control region 505 of the second TTI 525 may carry a grant of the same resources for the UE 115, e.g., for the data region 510 of the second TTI 525. In some aspects, the UE 115 may use soft combining using the control regions 505 of the first TTI 520 and the second TTI 525. For example, each control region 505 of the first and second TTIs may carry the same (or substantially similar) bits such that the UE 115 can combine the power across the time domain to decode the grant.

In some aspects, a base station 105 may select or otherwise identify a grant repetition configuration to use for the UE 115. For example, the base station 105 may have multiple grant repetition configurations to choose from and identify at least one to use for communicating a grant to the UE 115 based on a metric associated with the communications with the UE 115, based on channel conditions, etc. The base station 105 may generate a parameter that corresponds to the selected grant repetition configuration, e.g., a grant repetition parameter that is associated with the selected grant repetition configuration. The grant repetition parameter may be one or more bits or a field that the base station 105 communicates to the UE 115 semi-statically, e.g., in an RRC signal, and/or dynamically, e.g., in a DCI.

Generally, the grant repetition configuration may include a pattern in which the base station 105 will repeat the transmission of the grant to the UE 115. In the example grant repetition configuration 500, the base station 105 may transmit the grant in the control region 505 during the first TTI 520 using the same set of carriers as are used in the control region 505 of the second TTI 525. However, in some aspects there may not be a deterministic relationship between the control regions 505 of the first TTI 520 and the second TTI 525. In such cases, the base station 105 may make the decision as to whether the grant is retransmitted in the control region 505 of the second TTI 525. However, if the grant is retransmitted in the control region 505 of the second TTI 525, the grant may allocate the same resources for the data region 510 as the grant carried in the control region 505 of the first TTI 520.

Thus, to support soft combining at the UE 115, the grants carried in the different TTIs may use various options. In one option, a special coding technique is used that allows soft combining even when there are minor differences in the grant payloads. Examples of the special coding techniques include, but are not limited to, a puncture turbo coder, or a low-density parity check (LDPC) coding technique. In another option, the same payload is used in each grant, but a scrambling technique is used where different coded bits are scrambled and used to carry additional offset information. These techniques may allow the UE 115 to use soft combining where the power is stacked in the time domain.

Figure 6:
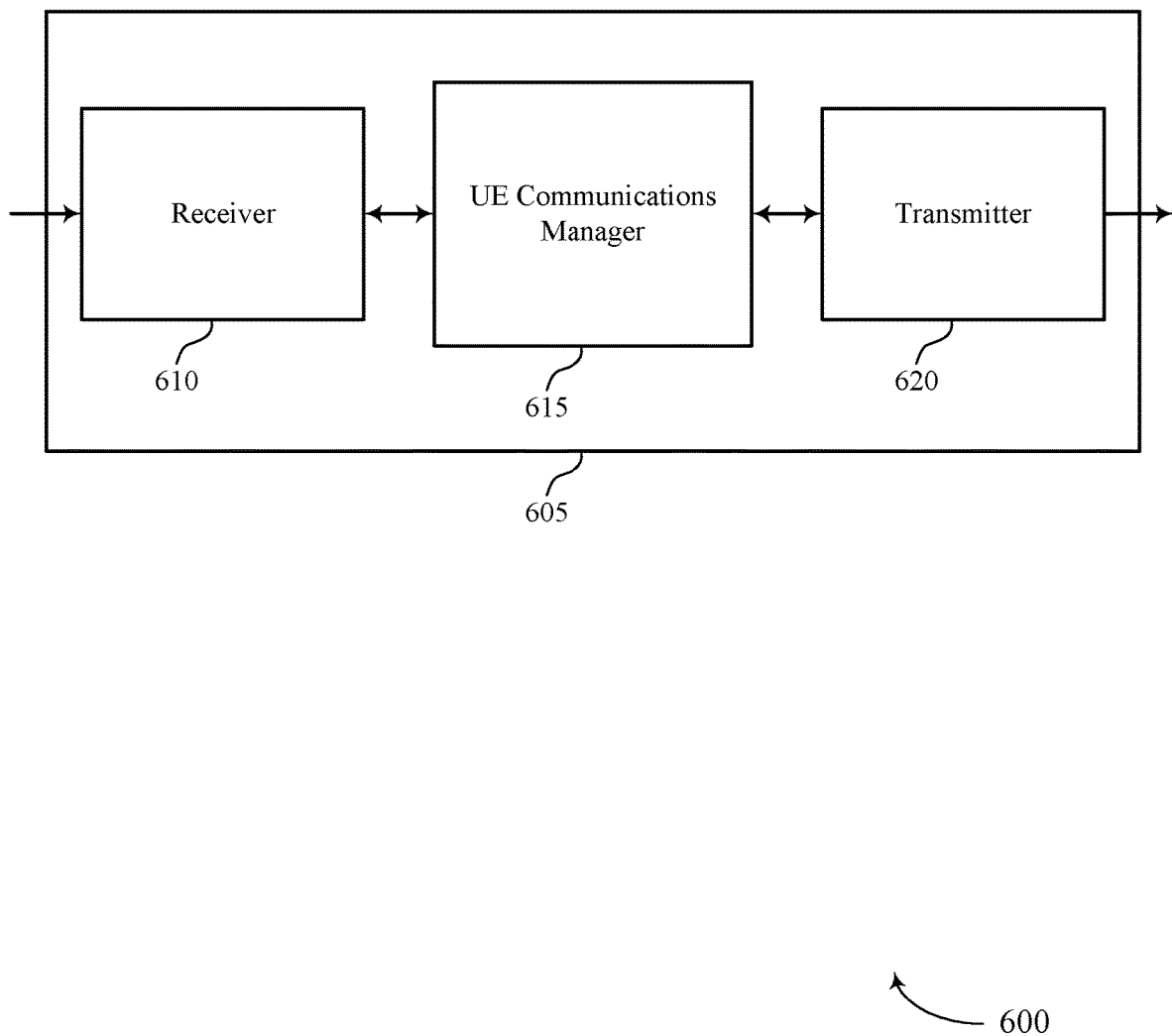
FIGS. 6 through 8 show block diagrams of a device that supports PDCCH retransmission for URLLC in accordance with aspects of the present disclosure.

FIG. 6 shows a block diagram 600 of a wireless device 605 that supports PDCCH retransmission for URLLC in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to PDCCH retransmission for URLLC, etc.). Information may be passed on to other components of the device. Receiver 610 may be an example of aspects of transceiver 935 described with reference to FIG. 9. Receiver 610 may utilize a single antenna or a set of antennas.

UE communications manager 615 may be an example of aspects of UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of UE communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive a grant repetition parameter from a base station, determine a grant repetition configuration corresponding to the grant repetition parameter, and monitor for a repetition of grants corresponding to the determined grant repetition configuration. In some cases, each grant in the repetition of grants has a different offset value and indicates same resources allocated for a shared data channel in a same transmission time interval (TTI). In some cases, the rant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants. In such cases, the UE 115 may monitor for the respective grants at the resources based at least in part on the relationship.

Transmitter 620 may transmit signals generated by other components of the device 605. In some examples, transmitter 620 may be collocated with receiver 610 in a transceiver module. For example, transmitter 620 may be an example of aspects of transceiver 935 described with reference to FIG. 9. Transmitter 620 may utilize a single antenna or a set of antennas.

Figure 7:
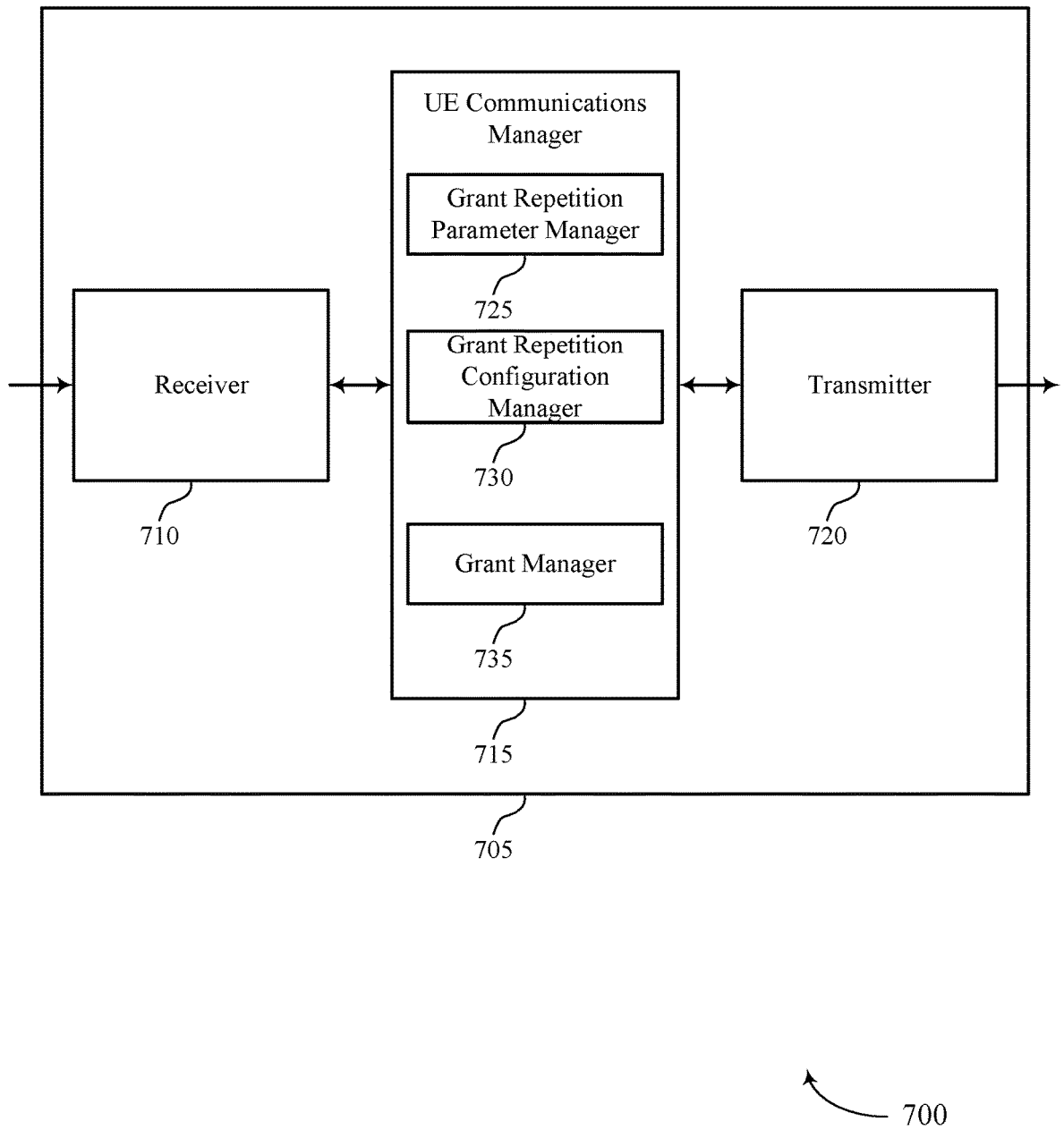

FIG. 7 shows a block diagram 700 of a wireless device 705 that supports PDCCH retransmission for URLLC in accordance with aspects of the present disclosure. Wireless device 705 may be an example of aspects of a wireless device 605 or a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to PDCCH retransmission for URLLC, etc.). Information may be passed on to other components of the device 705. Receiver 710 may be an example of aspects of transceiver 935 described with reference to FIG. 9. Receiver 710 may utilize a single antenna or a set of antennas.

UE communications manager 715 may be an example of aspects of UE communications manager 915 described with reference to FIG. 9.

UE communications manager 715 may also include grant repetition parameter manager 725, grant repetition configuration manager 730, and grant manager 735.

Grant repetition parameter manager 725 may receive a grant repetition parameter from a base station.

Grant repetition configuration manager 730 may determine a grant repetition configuration corresponding to the grant repetition parameter.

Grant manager 735 may monitor for a repetition of grants corresponding to the determined grant repetition configuration. In some cases, monitoring for the repetition of grants includes: monitoring for the repetition of grants in a set of transmission time intervals, where each grant of the repetition of grants identifies resources allocated to the UE 115 within a shared data channel of a transmission time interval. In some cases, a first grant of the repetition of grants identifies resources allocated to the UE 115 within a downlink shared data channel of a transmission time interval that occurs prior to a transmission time interval of the first grant. In some cases, each grant in the repetition of grants has a different offset value and indicates same resources allocated for a shared data channel in a same transmission time interval (TTI). In some cases, the grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants. In such cases, grant manager 735 may monitor for the respective grants at the resources based at least in part on the relationship.

Transmitter 720 may transmit signals generated by other components of the device. In some examples, transmitter 720 may be collocated with receiver 710 in a transceiver module. For example, transmitter 720 may be an example of aspects of transceiver 935 described with reference to FIG. 9. Transmitter 720 may utilize a single antenna or a set of antennas.

Figure 8:
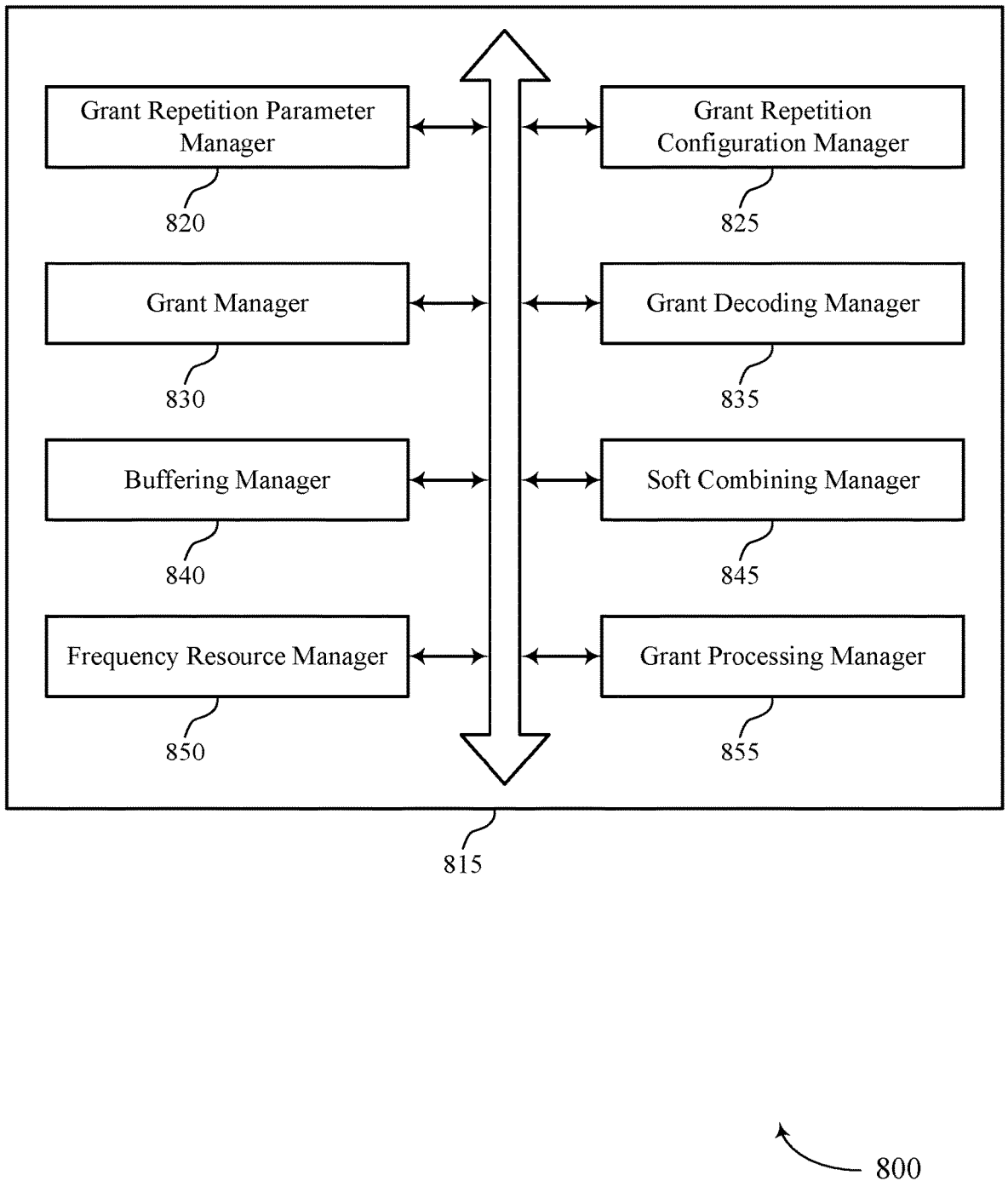

FIG. 8 shows a block diagram 800 of UE communications manager 815 that supports PDCCH retransmission for URLLC in accordance with aspects of the present disclosure. UE communications manager 815 may be an example of aspects of UE communications manager 615, UE communications manager 715, or UE communications manager 915 described with reference to FIGS. 6, 7, and 9. UE communications manager 815 may include grant repetition parameter manager 820, grant repetition configuration manager 825, grant manager 830, grant decoding manager 835, buffering manager 840, soft combining manager 845, frequency resource manager 850, and grant processing manager 855. Each of these modules may communicate, directly or indirectly, with one another (e.g., via one or more buses).

Grant repetition parameter manager 820 may receive a grant repetition parameter from a base station.

Grant repetition configuration manager 825 may determine a grant repetition configuration corresponding to the grant repetition parameter.

Grant manager 830 may monitor for a repetition of grants corresponding to the determined grant repetition configuration. In some cases, each grant in the repetition of grants has a different offset value and indicates same resources allocated for a shared data channel in a same transmission time interval (TTI). In some cases, the determined grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants. In such cases, grant manager 830 may monitor for the respective grants at the resources based at least in part on the relationship. In some cases, monitoring for the repetition of grants includes: monitoring for the repetition of grants in a set of transmission time intervals, where each grant of the repetition of grants identifies resources allocated to the UE 115 within a shared data channel of a transmission time interval. In some cases, a first grant of the repetition of grants identifies resources allocated to the UE 115 within a downlink shared data channel of a transmission time interval that occurs prior to a transmission time interval of the first grant.

Grant decoding manager 835 may decode a downlink shared data channel based on the received grant. In some cases, monitoring for the repetition of grants includes: receiving a grant corresponding to the determined grant repetition configuration.

Buffering manager 840 may buffer a set of symbols that are received in a transmission time interval prior to a transmission time interval of a first grant of the repetition of grants, determine that the set of symbols include downlink data allocated to the UE 115 in the first grant, and decode the set of symbols based on the first grant.

Soft combining manager 845 may perform soft combining during decoding of the repetition of grants, perform soft combining during decoding of the repetition of grants based on the grant repetition configuration indicating a coding technique applied to the repetition of grants, and perform soft combining during decoding of the repetition of grants based on the grant repetition configuration indicating a scrambling technique applied to a first grant of the repetition of grants.

Frequency resource manager 850 may determine that each of the repetition of grants is transmitted within the same frequency resources in different transmission time intervals based on the grant repetition configuration, determine that data corresponding to the repetition of grants is transmitted within a downlink shared data channel of a transmission time interval based on the grant repetition configuration, and determine that data corresponding to the repetition of grants is transmitted within a downlink shared data channel of each of a set of transmission time intervals based on the grant repetition configuration.

Grant processing manager 855 may process the grant repetition parameter to identify the grant repetition configuration from a set of different grant repetition configurations for receiving repeated grants in the time domain.

Figure 9:
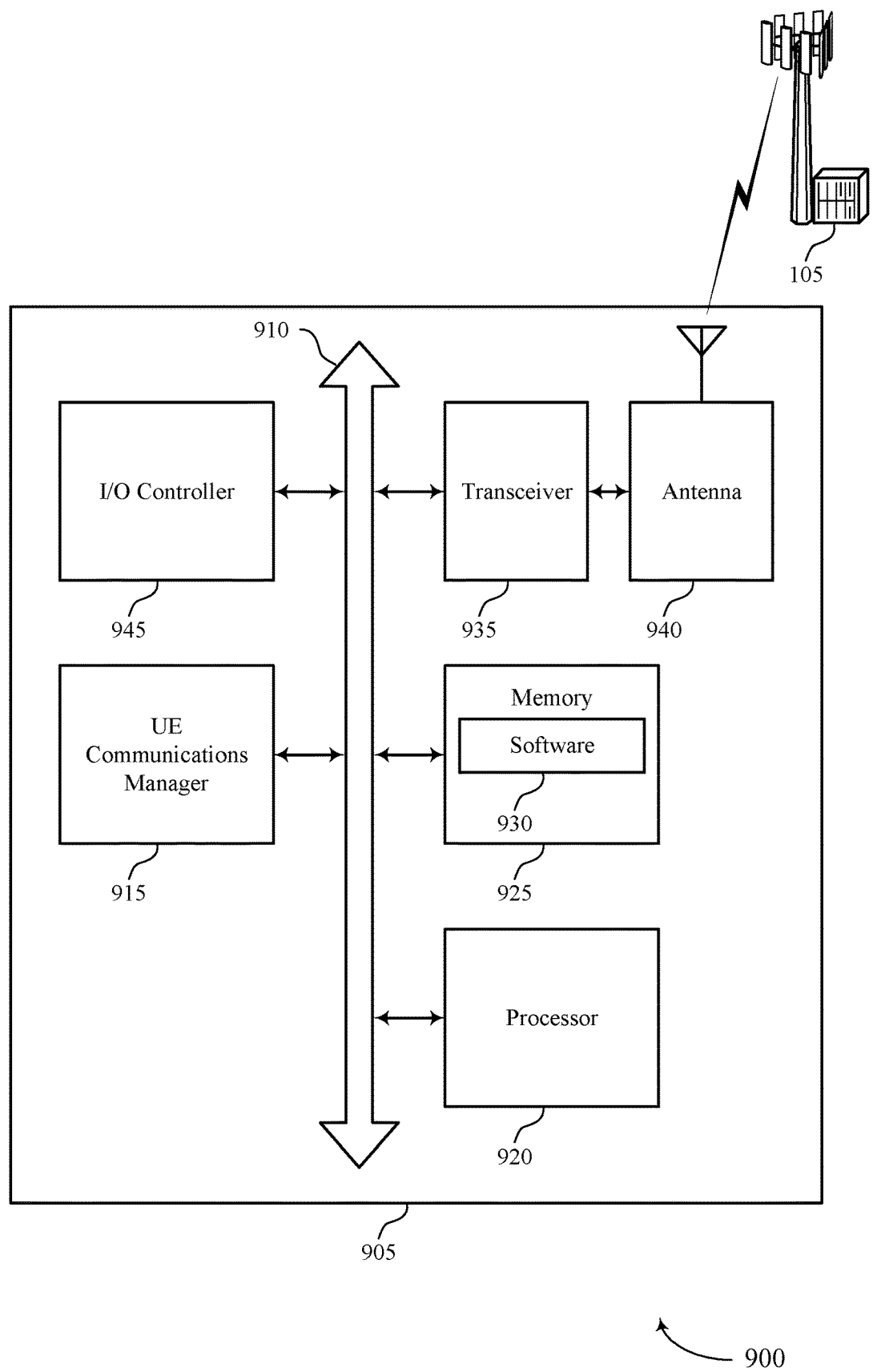
FIG. 9 illustrates a block diagram of a system including a UE that supports PDCCH retransmission for URLLC in accordance with aspects of the present disclosure.

FIG. 9 shows a diagram of a system 900 including a device 905 that supports PDCCH retransmission for URLLC in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting PDCCH retransmission for URLLC).

Memory 925 may include random access memory (RAM) and read only memory (ROM). Memory 925 may store computer-readable, computer-executable software 930 including instructions that, when executed, cause the processor to perform various functions described herein. In some cases, memory 925 may contain, among other things, a basic input/output system (BIOS) which may control basic hardware or software operation such as the interaction with peripheral components or devices.

Software 930 may include code to implement aspects of the present disclosure, including code to support PDCCH retransmission for URLLC. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
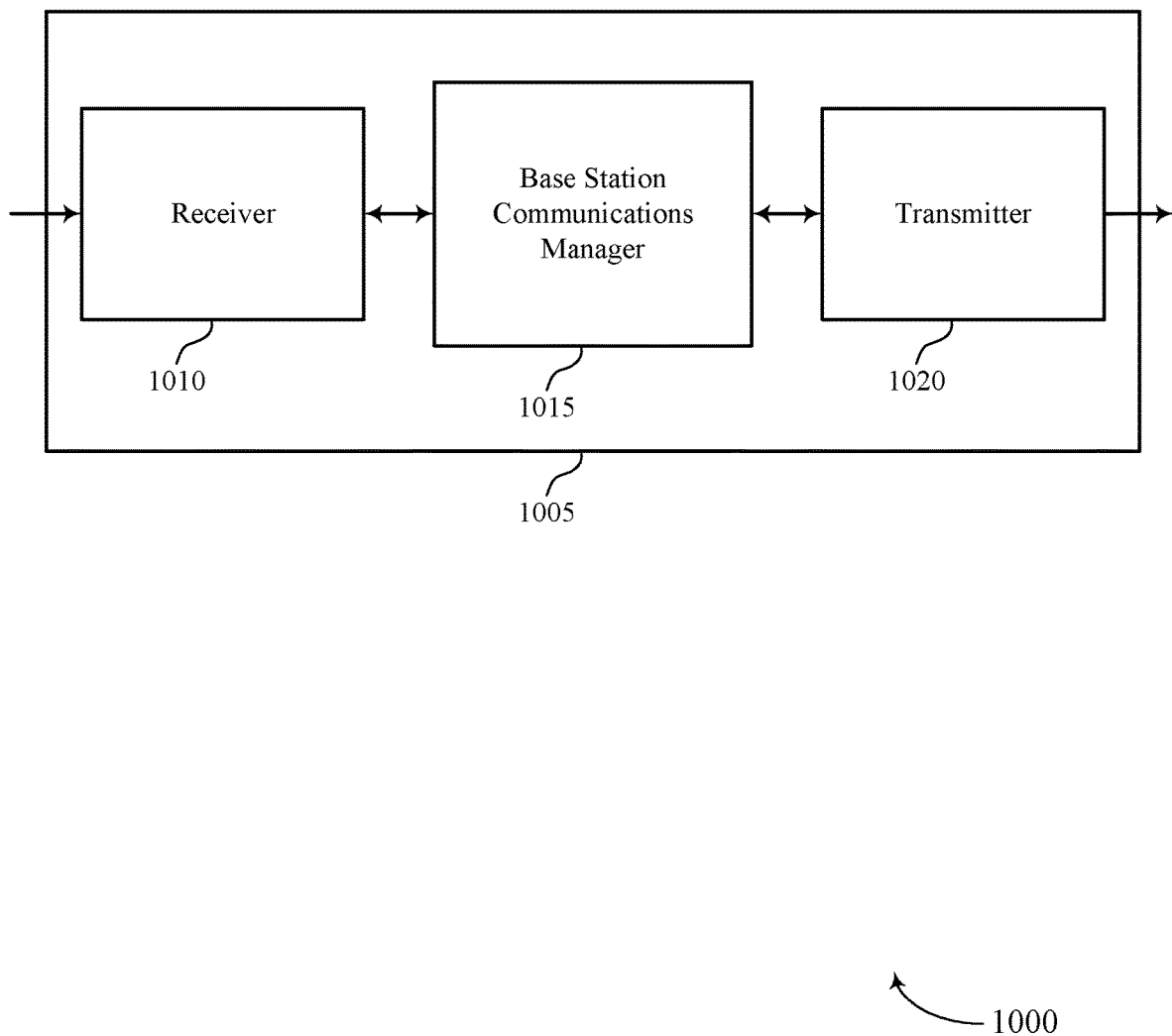
FIGS. 10 through 12 show block diagrams of a device that supports PDCCH retransmission for URLLC in accordance with aspects of the present disclosure.

FIG. 10 shows a block diagram 1000 of a wireless device 1005 that supports PDCCH retransmission for URLLC in accordance with aspects of the present disclosure. Wireless device 1005 may be an example of aspects of a base station as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to PDCCH retransmission for URLLC, etc.). Information may be passed on to other components of the device. Receiver 1010 may be an example of aspects of transceiver 1335 described with reference to FIG. 13. Receiver 1010 may utilize a single antenna or a set of antennas.

Base station communications manager 1015 may be an example of aspects of base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a first grant repetition configuration of a set of grant repetition configurations for a UE 115, generate a grant repetition parameter corresponding to the first grant repetition configuration, transmit the grant repetition parameter to the UE 115 to indicate the first grant repetition configuration, and transmit a repetition of grants in accordance with the first grant repetition configuration. In some cases, each grant in the repetition of grants has a different offset value and indicates same resources allocated for a shared data channel in a same transmission time interval (TTI). In some cases, the first grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants.

Transmitter 1020 may transmit signals generated by other components of the device 1005. In some examples, transmitter 1020 may be collocated with receiver 1010 in a transceiver module. For example, transmitter 1020 may be an example of aspects of transceiver 1335 described with reference to FIG. 13. Transmitter 1020 may utilize a single antenna or a set of antennas.

Figure 11:
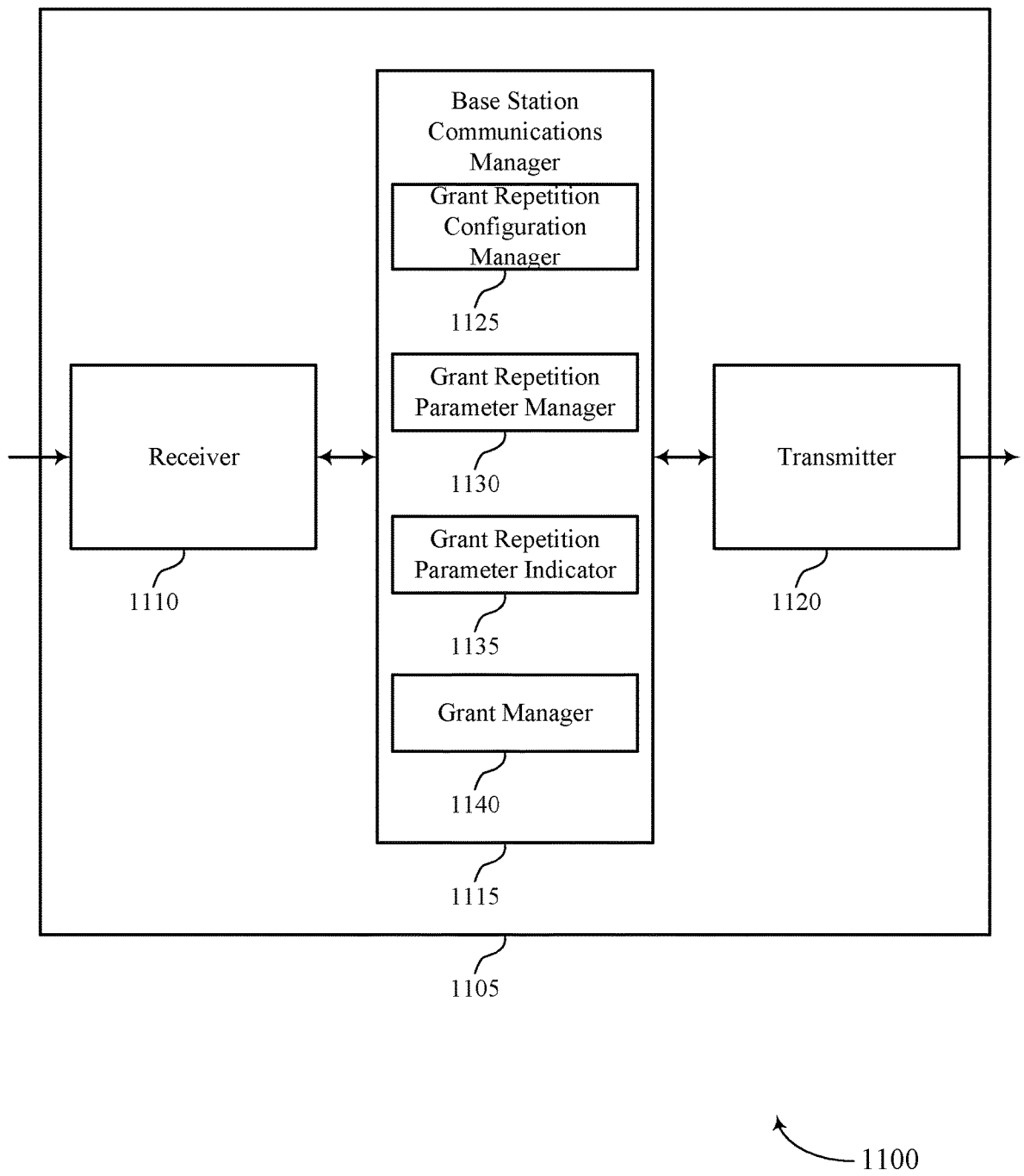

FIG. 11 shows a block diagram 1100 of a wireless device 1105 that supports PDCCH retransmission for URLLC in accordance with aspects of the present disclosure. Wireless device 1105 may be an example of aspects of a wireless device 1005 or a base station, as described herein. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to PDCCH retransmission for URLLC, etc.). Information may be passed on to other components of the device 1105. Receiver 1110 may be an example of aspects of transceiver 1335 described with reference to FIG. 13. Receiver 1110 may utilize a single antenna or a set of antennas.

Base station communications manager 1115 may be an example of aspects of base station communications manager 1315 described with reference to FIG. 13.

Base station communications manager 1115 may also include grant repetition configuration manager 1125, grant repetition parameter manager 1130, grant repetition parameter indicator 1135, and grant manager 1140.

Grant repetition configuration manager 1125 may identify a first grant repetition configuration of a set of grant repetition configurations for a UE. In some cases, each grant in the repetition of grants has a different offset value and indicates same resources allocated for a shared data channel in a same transmission time interval (TTI). In some cases, the first grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants.

Grant repetition parameter manager 1130 may generate a grant repetition parameter corresponding to the first grant repetition configuration. In some cases, generating the grant repetition parameter includes: generating the grant repetition parameter to identify the first grant repetition configuration of a set of different grant repetition configurations for sending repeated grants in the time domain.

Grant repetition parameter indicator 1135 may transmit the grant repetition parameter to the UE 115 to indicate the first grant repetition configuration.

Grant manager 1140 may transmit a repetition of grants in accordance with the first grant repetition configuration. In some cases, each grant of the repetition of grants identifies resources allocated to the UE 115 within a shared data channel of a transmission time interval. In some cases, a first grant of the repetition of grants identifies resources allocated to the UE 115 within a downlink shared data channel of a transmission time interval that occurs prior to a transmission time interval of the first grant.

Transmitter 1120 may transmit signals generated by other components of the device 1105. In some examples, transmitter 1120 may be collocated with receiver 1110 in a transceiver module. For example, transmitter 1120 may be an example of aspects of transceiver 1335 described with reference to FIG. 13. Transmitter 1120 may utilize a single antenna or a set of antennas.

Figure 12:
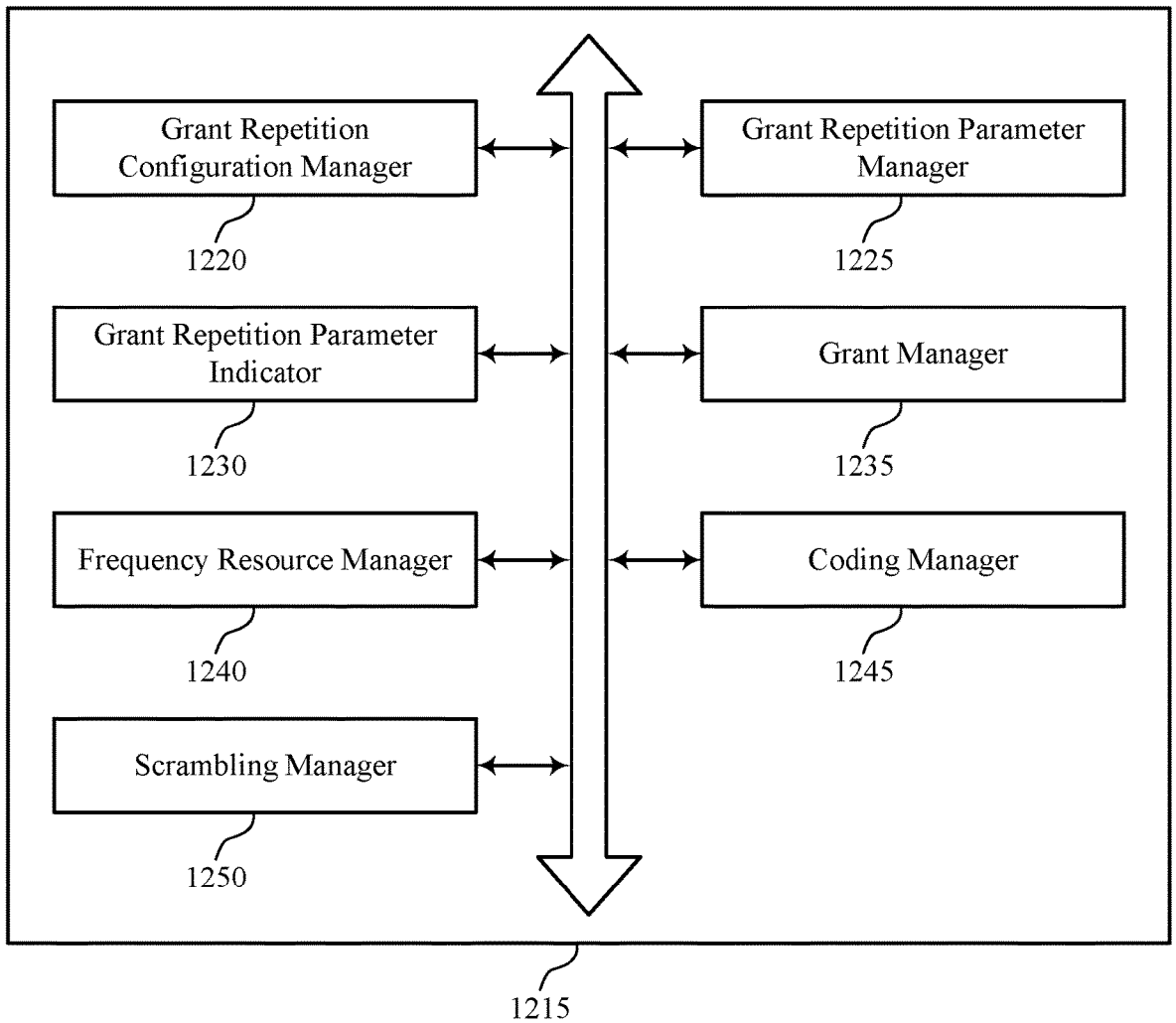

FIG. 12 shows a block diagram 1200 of a base station communications manager 1215 that supports PDCCH retransmission for URLLC in accordance with aspects of the present disclosure. Base station communications manager 1215 may be an example of aspects of base station communications manager 1315 described with reference to FIGS. 10, 11, and 13. Base station communications manager 1215 may include grant repetition configuration manager 1220, grant repetition parameter manager 1225, grant repetition parameter indicator 1230, grant manager 1235, frequency resource manager 1240, coding manager 1245, and scrambling manager 1250. Each of these modules may communicate, directly or indirectly, with one another (e.g., via one or more buses).

Grant repetition configuration manager 1220 may identify a first grant repetition configuration of a set of grant repetition configurations for a UE.

Grant repetition parameter manager 1225 may generate a grant repetition parameter corresponding to the first grant repetition configuration. In some cases, generating the grant repetition parameter includes: generating the grant repetition parameter to identify the first grant repetition configuration of a set of different grant repetition configurations for sending repeated grants in the time domain.

Grant repetition parameter indicator 1230 may transmit the grant repetition parameter to the UE 115 to indicate the first grant repetition configuration. In some cases, each grant in the repetition of grants has a different offset value and indicates same resources allocated for a shared data channel in a same transmission time interval (TTI). In some cases, the first grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants.

Grant manager 1235 may transmit a repetition of grants in accordance with the first grant repetition configuration. In some cases, each grant of the repetition of grants identifies resources allocated to the UE 115 within a shared data channel of a transmission time interval. In some cases, a first grant of the repetition of grants identifies resources allocated to the UE 115 within a downlink shared data channel of a transmission time interval that occurs prior to a transmission time interval of the first grant.

Frequency resource manager 1240 may transmit data corresponding to the repetition of grants within a downlink shared data channel of a transmission time interval and transmit data corresponding to the repetition of grants within a downlink shared data channel in each of the transmission time intervals. In some cases, transmitting the repetition of grants includes: transmitting each grant of the repetition of grants within the same frequency resources in respective transmission time intervals in accordance with the first grant repetition configuration.

Coding manager 1245 may determine that grants of the repetition of grants differ by at least one bit and apply a coding technique to generate the grants.

Scrambling manager 1250 may determine that grants of the repetition of grants differ by at least one bit and apply a scrambling technique to a first grant of the grants.

Figure 13:
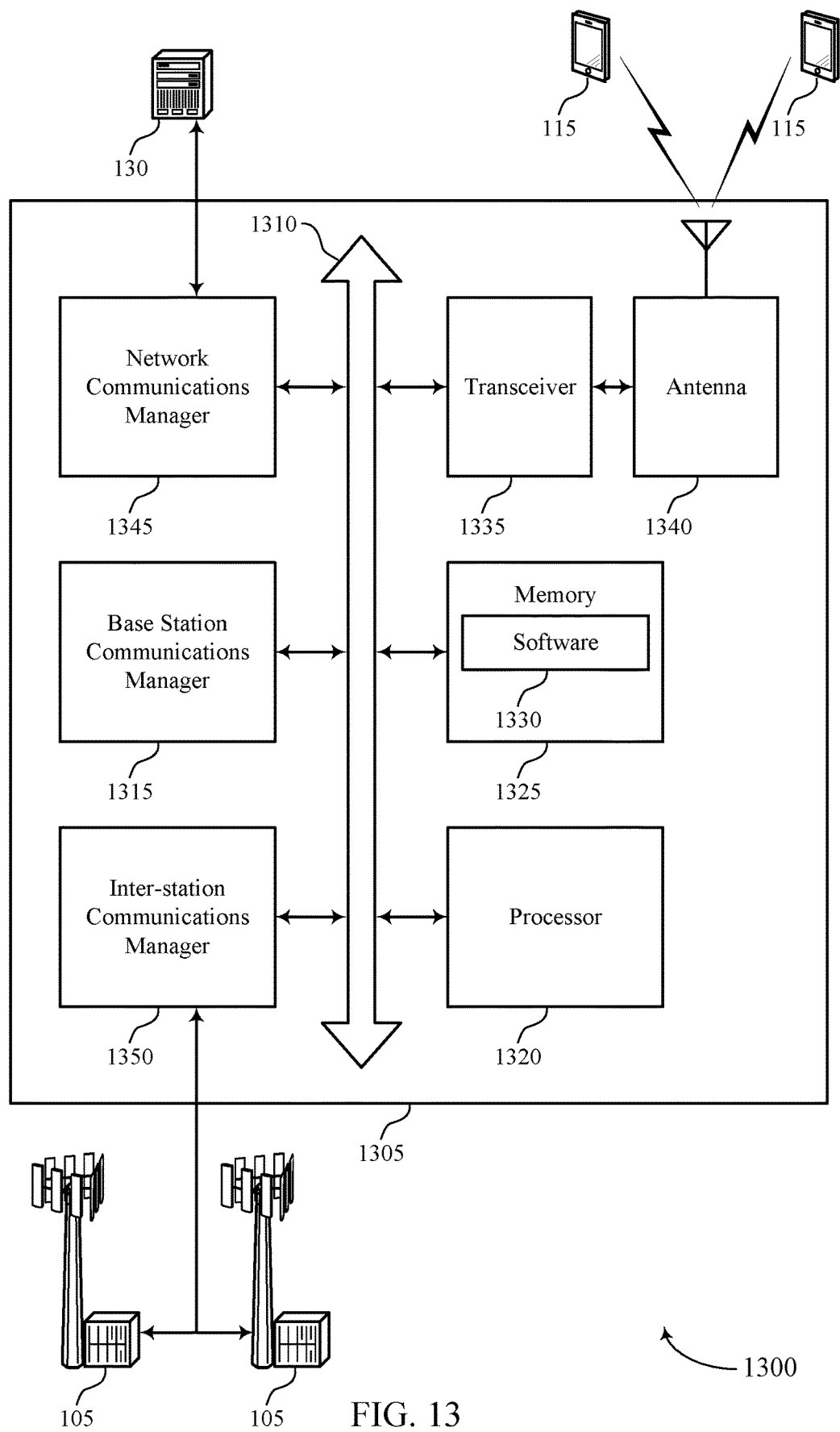
FIG. 13 illustrates a block diagram of a system including a base station that supports PDCCH retransmission for URLLC in accordance with aspects of the present disclosure.

FIG. 13 shows a diagram of a system 1300 including a device 1305 that supports PDCCH retransmission for URLLC in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting PDCCH retransmission for URLLC).

Memory 1325 may include RAM and ROM. Memory 1325 may store computer-readable, computer-executable software 1330 including instructions that, when executed, cause the processor to perform various functions described herein. In some cases, memory 1325 may contain, among other things, a BIOS which may control basic hardware or software operation such as the interaction with peripheral components or devices.

Software 1330 may include code to implement aspects of the present disclosure, including code to support PDCCH retransmission for URLLC. Software 1330 may be stored in a non-transitory computer-readable medium such as system memory or other memory. In some cases, software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. Transceiver 1335 may also include a modem to modulate the packets and provide the modulated packets to the antennas for transmission, and to demodulate packets received from the antennas.

In some cases, the wireless device 1305 may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
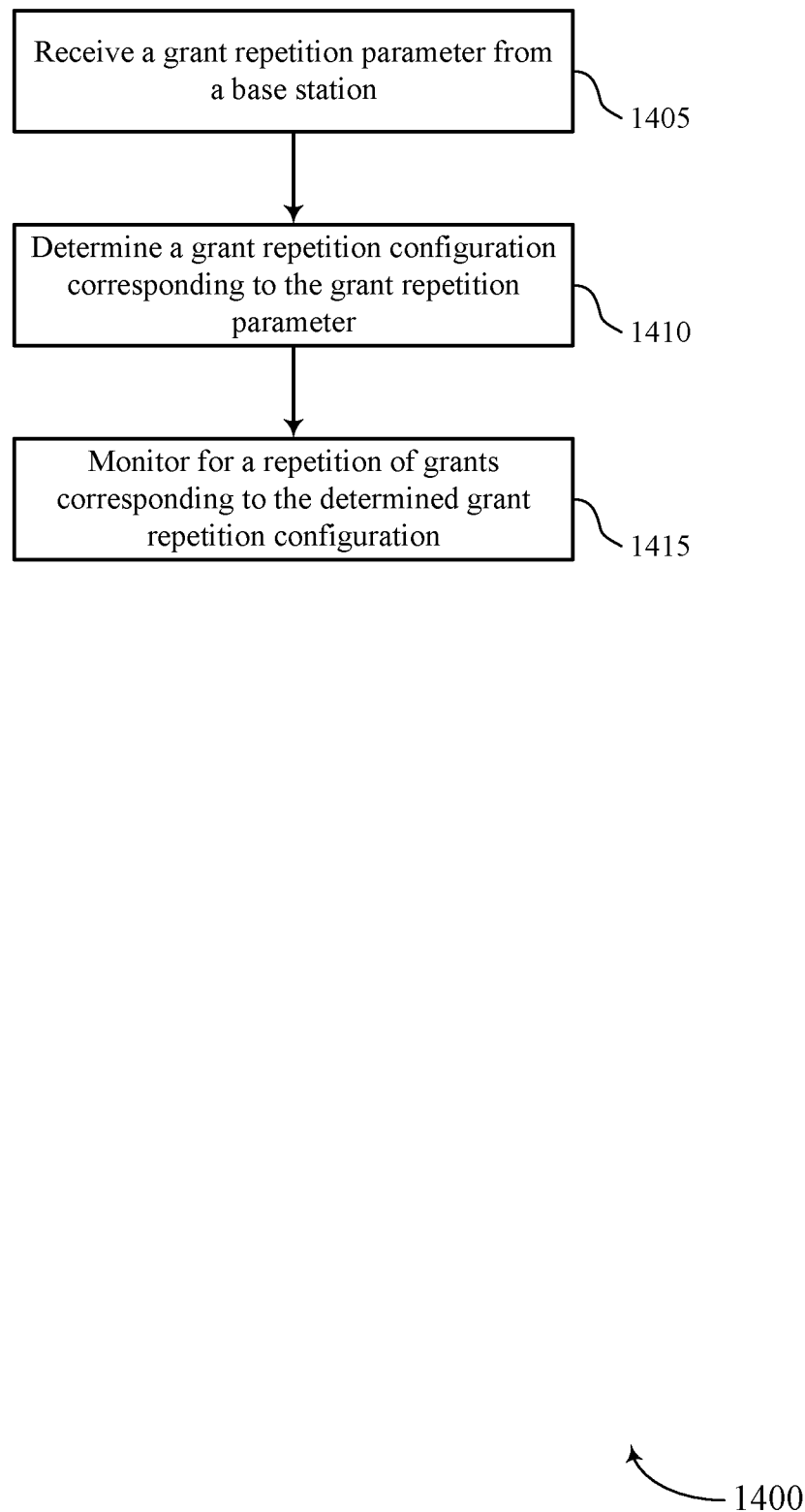
FIGS. 14 through 19 illustrate methods for PDCCH retransmission for URLLC in accordance with aspects of the present disclosure.

FIG. 14 shows a flowchart illustrating a method 1400 for PDCCH retransmission for URLLC in accordance with aspects of the present disclosure. The operations of method 1400 may be implemented by a UE 115 or its components as described herein. For example, the operations of method 1400 may be performed by UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may receive a grant repetition parameter from a base station. The operations of block 1405 may be performed according to the methods described herein. In certain examples, aspects of the operations of block 1405 may be performed by grant repetition parameter manager as described with reference to FIGS. 6 through 9.

At block 1410, the UE 115 may determine a grant repetition configuration corresponding to the grant repetition parameter. In some cases, each grant in the repetition of grants has a different offset value and indicates same resources allocated for a shared data channel in a same transmission time interval (TTI). In some cases, the grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants. The operations of block 1410 may be performed according to the methods described herein. In certain examples, aspects of the operations of block 1410 may be performed by grant repetition configuration manager as described with reference to FIGS. 6 through 9.

At block 1415, the UE 115 may monitor for a repetition of grants corresponding to the determined grant repetition configuration. The operations of block 1415 may be performed according to the methods described herein. In certain examples, aspects of the operations of block 1415 may be performed by grant manager as described with reference to FIGS. 6 through 9.

Figure 15:
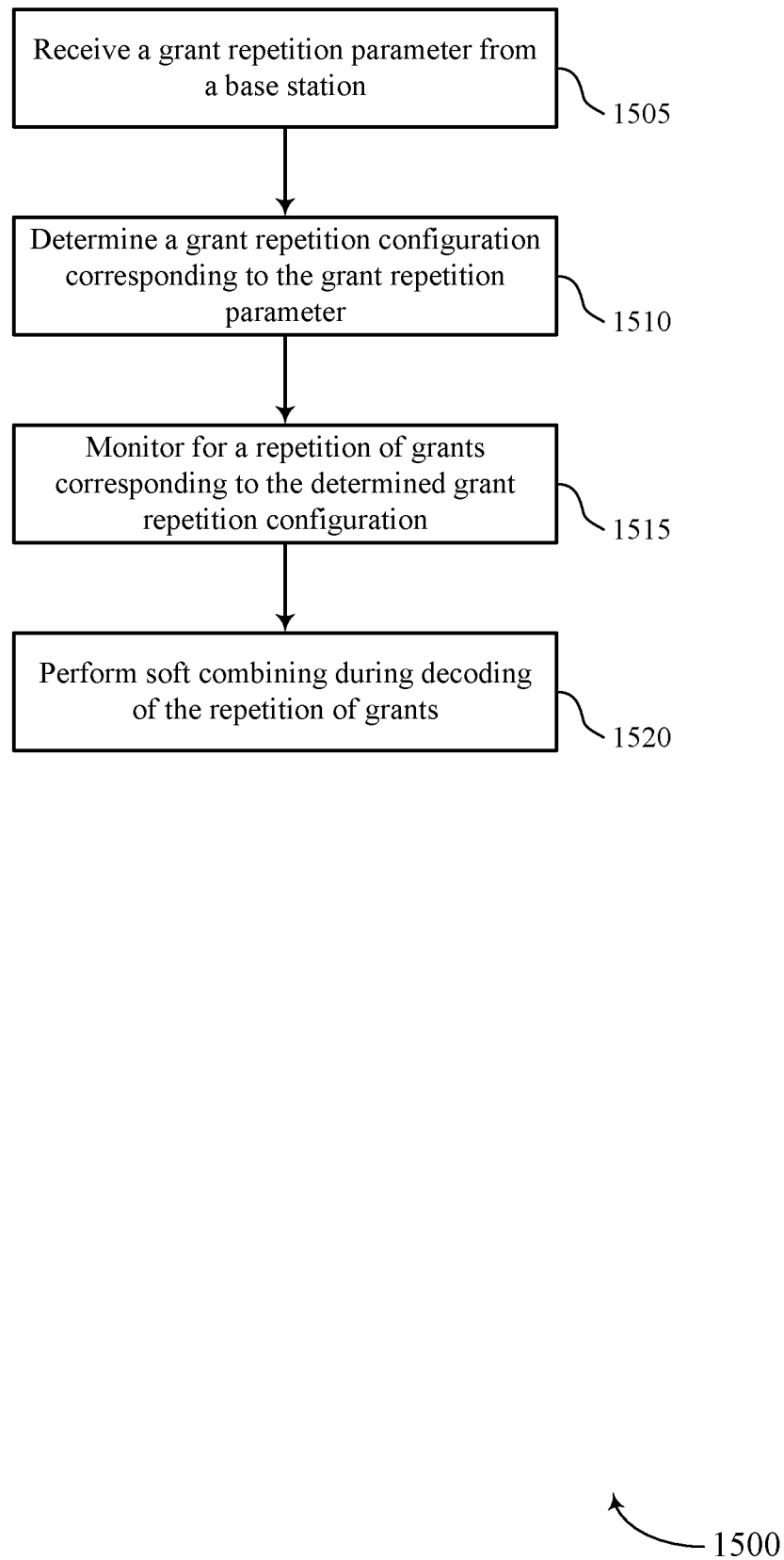

FIG. 15 shows a flowchart illustrating a method 1500 for PDCCH retransmission for URLLC in accordance with aspects of the present disclosure. The operations of method 1500 may be implemented by a UE 115 or its components as described herein. For example, the operations of method 1500 may be performed by UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may receive a grant repetition parameter from a base station. The operations of block 1505 may be performed according to the methods described herein. In certain examples, aspects of the operations of block 1505 may be performed by grant repetition parameter manager as described with reference to FIGS. 6 through 9.

At block 1510, the UE 115 may determine a grant repetition configuration corresponding to the grant repetition parameter. In some cases, each grant in the repetition of grants has a different offset value and indicates same resources allocated for a shared data channel in a same transmission time interval (TTI). In some cases, the grant repetition configuration may indicate a relationship between resources that include respective grants of the repetition of grants, the relationship indicating a subsequent resource of the resources in which to monitor for a subsequent grant of the repetition of grants based at least in part on a prior resource of the resources that includes a prior grant of the repetition of grants. The operations of block 1510 may be performed according to the methods described herein. In certain examples, aspects of the operations of block 1510 may be performed by grant repetition configuration manager as described with reference to FIGS. 6 through 9.

At block 1515, the UE 115 may monitor for a repetition of grants corresponding to the determined grant repetition configuration. The operations of block 1515 may be performed according to the methods described herein. In certain examples, aspects of the operations of block 1515 may be performed by grant manager as described with reference to FIGS. 6 through 9.

At block 1520, the UE 115 may perform soft combining during decoding of the repetition of grants. The operations of block 1520 may be performed according to the methods described herein. In certain examples, aspects of the operations of block 1520 may be performed by soft combining manager as described with reference to FIGS. 6 through 9.

Figure 16:
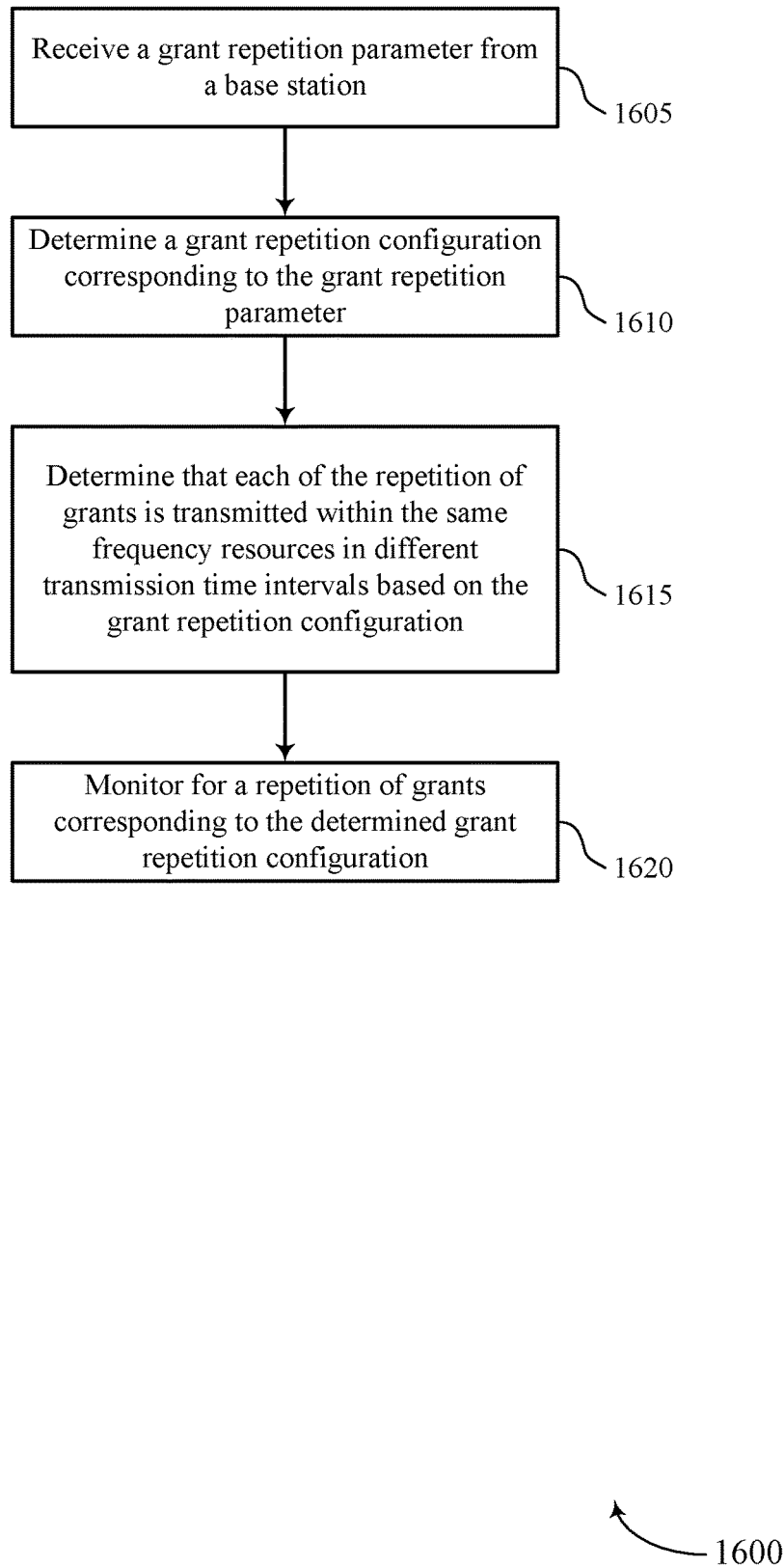

FIG. 16 shows a flowchart illustrating a method 1600 for PDCCH retransmission for URLLC in accordance with aspects of the present disclosure. The operations of method 1600 may be implemented by a UE 115 or its components as described herein. For example, the operations of method 1600 may be performed by UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may receive a grant repetition parameter from a base station. The operations of block 1605 may be performed according to the methods described herein. In certain examples, aspects of the operations of block 1605 may be performed by grant repetition parameter manager as described with reference to FIGS. 6 through 9.

At block 1610, the UE 115 may determine a grant repetition configuration corresponding to the grant repetition parameter. The operations of block 1610 may be performed according to the methods described herein. In certain examples, aspects of the operations of block 1610 may be performed by grant repetition configuration manager as described with reference to FIGS. 6 through 9.

At block 1615, the UE 115 may determine that each of the repetition of grants is transmitted within the same frequency resources in different transmission time intervals based at least in part on the grant repetition configuration. The operations of block 1615 may be performed according to the methods described herein. In certain examples, aspects of the operations of block 1615 may be performed by frequency resource manager as described with reference to FIGS. 6 through 9.

At block 1620, the UE 115 may monitor for a repetition of grants corresponding to the determined grant repetition configuration. The operations of block 1620 may be performed according to the methods described herein. In certain examples, aspects of the operations of block 1620 may be performed by grant manager as described with reference to FIGS. 6 through 9.

Figure 17:
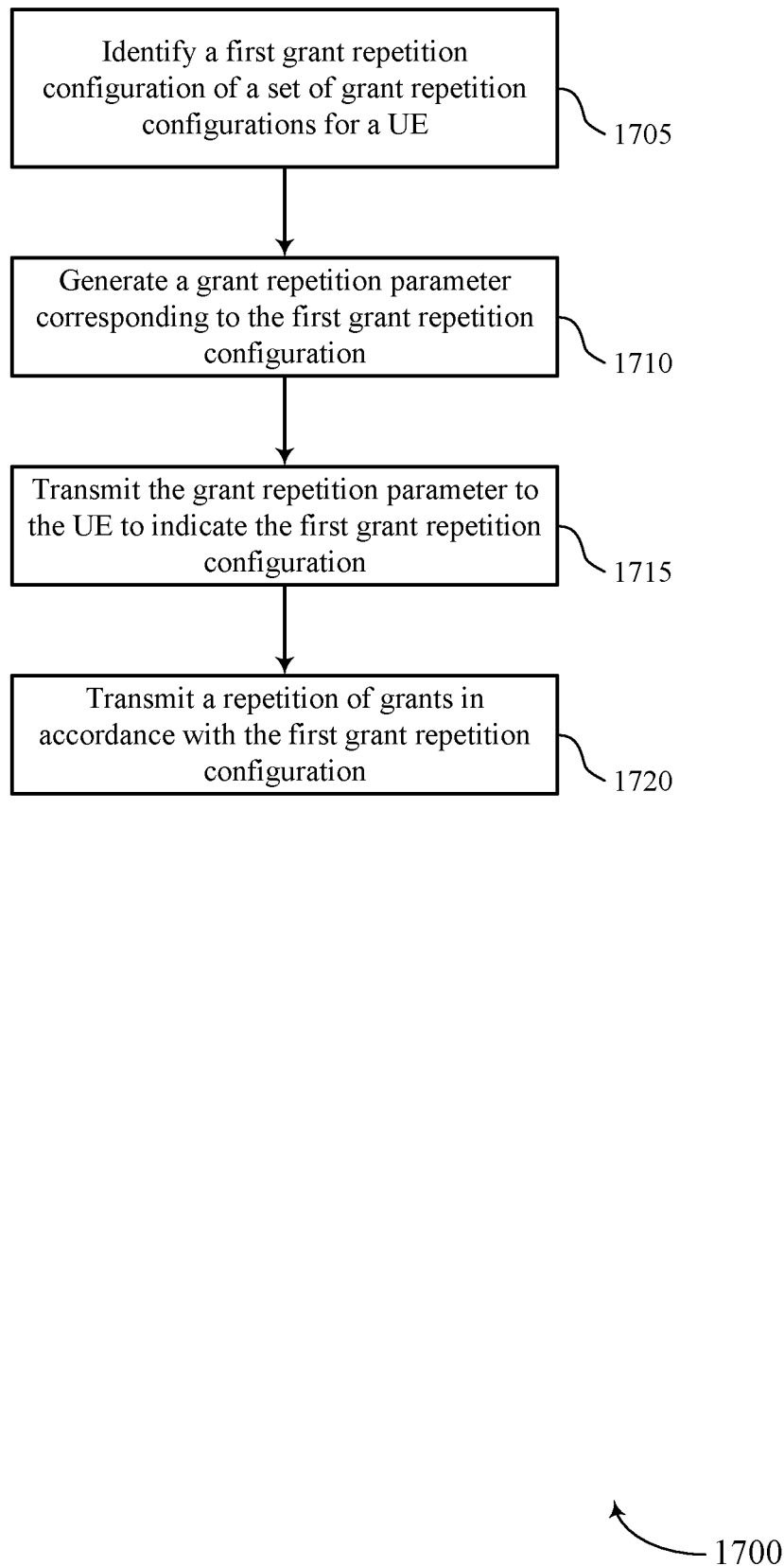

FIG. 17 shows a flowchart illustrating a method 1700 for PDCCH retransmission for URLLC in accordance with aspects of the present disclosure. The operations of method 1700 may be implemented by a base station 105 or its components as described herein. For example, the operations of method 1700 may be performed by base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705, the base station 105 may identify a first grant repetition configuration of a plurality of grant repetition configurations for a user equipment (UE). The operations of block 1705 may be performed according to the methods described herein. In certain examples, aspects of the operations of block 1705 may be performed by grant repetition configuration manager as described with reference to FIGS. 10 through 13.

At block 1710, the base station 105 may generate a grant repetition parameter corresponding to the first grant repetition configuration. The operations of block 1710 may be performed according to the methods described herein. In certain examples, aspects of the operations of block 1710 may be performed by grant repetition parameter manager as described with reference to FIGS. 10 through 13.

At block 1715, the base station 105 may transmit the grant repetition parameter to the UE 115 to indicate the first grant repetition configuration. The operations of block 1715 may be performed according to the methods described herein. In certain examples, aspects of the operations of block 1715 may be performed by grant repetition parameter indicator as described with reference to FIGS. 10 through 13.

At block 1720, the base station 105 may transmit a repetition of grants in accordance with the first grant repetition configuration. The operations of block 1720 may be performed according to the methods described herein. In certain examples, aspects of the operations of block 1720 may be performed by grant manager as described with reference to FIGS. 10 through 13.

Figure 18:
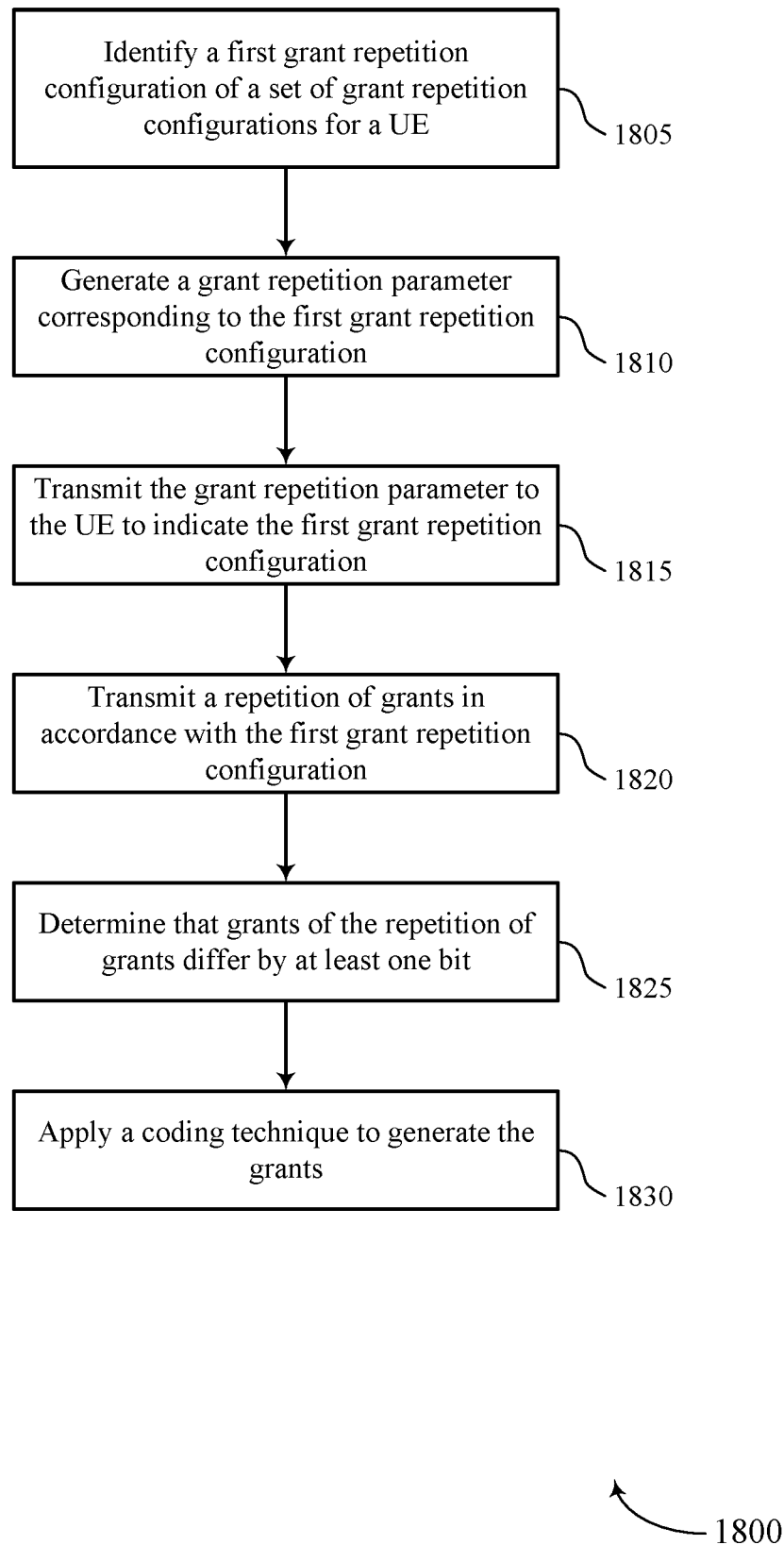

FIG. 18 shows a flowchart illustrating a method 1800 for PDCCH retransmission for URLLC in accordance with aspects of the present disclosure. The operations of method 1800 may be implemented by a base station 105 or its components as described herein. For example, the operations of method 1800 may be performed by base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1805, the base station 105 may identify a first grant repetition configuration of a plurality of grant repetition configurations for a user equipment (UE). The operations of block 1805 may be performed according to the methods described herein. In certain examples, aspects of the operations of block 1805 may be performed by grant repetition configuration manager as described with reference to FIGS. 10 through 13.

At block 1810, the base station 105 may generate a grant repetition parameter corresponding to the first grant repetition configuration. The operations of block 1810 may be performed according to the methods described herein. In certain examples, aspects of the operations of block 1810 may be performed by grant repetition parameter manager as described with reference to FIGS. 10 through 13.

At block 1815, the base station 105 may transmit the grant repetition parameter to the UE 115 to indicate the first grant repetition configuration. The operations of block 1815 may be performed according to the methods described herein. In certain examples, aspects of the operations of block 1815 may be performed by grant repetition parameter indicator as described with reference to FIGS. 10 through 13.

At block 1820, the base station 105 may transmit a repetition of grants in accordance with the first grant repetition configuration. The operations of block 1820 may be performed according to the methods described herein. In certain examples, aspects of the operations of block 1820 may be performed by grant manager as described with reference to FIGS. 10 through 13.

At block 1825, the base station 105 may determine that grants of the repetition of grants differ by at least one bit. The operations of block 1825 may be performed according to the methods described herein. In certain examples, aspects of the operations of block 1825 may be performed by coding manager as described with reference to FIGS. 10 through 13.

At block 1830, the base station 105 may apply a coding technique to generate the grants. The operations of block 1830 may be performed according to the methods described herein. In certain examples, aspects of the operations of block 1830 may be performed by a coding manager as described with reference to FIGS. 10 through 13.

Figure 19:
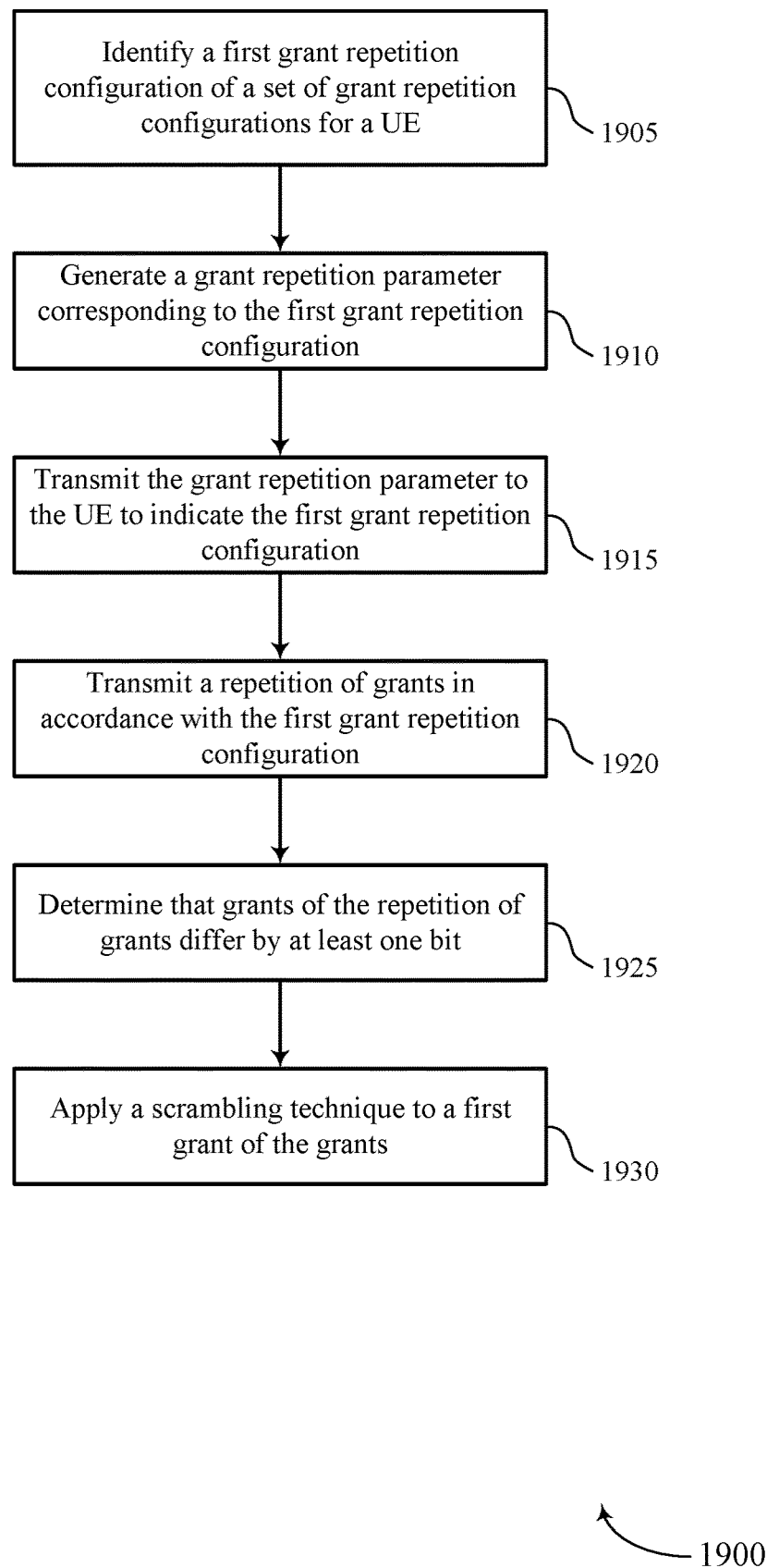

FIG. 19 shows a flowchart illustrating a method 1900 for PDCCH retransmission for URLLC in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1905, the base station 105 may identify a first grant repetition configuration of a plurality of grant repetition configurations for a user equipment (UE). The operations of block 1905 may be performed according to the methods described herein. In certain examples, aspects of the operations of block 1905 may be performed by grant repetition configuration manager as described with reference to FIGS. 10 through 13.

At block 1910, the base station 105 may generate a grant repetition parameter corresponding to the first grant repetition configuration. The operations of block 1910 may be performed according to the methods described herein. In certain examples, aspects of the operations of block 1910 may be performed by grant repetition parameter manager as described with reference to FIGS. 10 through 13.

At block 1915, the base station 105 may transmit the grant repetition parameter to the UE 115 to indicate the first grant repetition configuration. The operations of block 1915 may be performed according to the methods described herein. In certain examples, aspects of the operations of block 1915 may be performed by grant repetition parameter indicator as described with reference to FIGS. 10 through 13.

At block 1920, the base station 105 may transmit a repetition of grants in accordance with the first grant repetition configuration. The operations of block 1920 may be performed according to the methods described herein. In certain examples, aspects of the operations of block 1920 may be performed by grant manager as described with reference to FIGS. 10 through 13.

At block 1925, the base station 105 may determine that grants of the repetition of grants differ by at least one bit. The operations of block 1925 may be performed according to the methods described herein. In certain examples, aspects of the operations of block 1925 may be performed by scrambling manager as described with reference to FIGS. 10 through 13.

At block 1930, the base station 105 may apply a scrambling technique to a first grant of the grants. The operations of block 1930 may be performed according to the methods described herein. In certain examples, aspects of the operations of block 1930 may be performed by scrambling manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a grant repetition parameter from a base station;
   determining, from a plurality of different grant repetition configurations, a grant repetition configuration corresponding to the grant repetition parameter; and
   monitoring, over a downlink control channel and over a plurality of transmission time intervals, for a repetition of grants corresponding to the determined grant repetition configuration, each grant of the repetition of grants scheduled in a different transmission time interval of the plurality of transmission time intervals, wherein each grant of the repetition of grants includes a different offset value relative to that respective grant that indicates a same resource that is allocated for a shared data channel, the same resource that is allocated for the shared data channel in a single transmission time interval that is commonly indicated by the different offset value included in each grant of the repetition of grants.

2. The method of claim 1, further comprising:
   receiving a first grant of the repetition of grants, the first grant including a first offset value indicating a same transmission time interval as each other grant of the repetition of grants, wherein the same transmission time interval comprises the single transmission time interval;
   decoding the first grant based at least in part on the grant repetition parameter; and
   decoding the shared data channel corresponding to the decoded first grant based at least in part on the first offset value.

3. The method of claim 2, further comprising:
   skipping decoding of a second grant of the repetition of grants based at least in part on determining that decoding the first grant is successful.

4. The method of claim 2, wherein the first grant is an intermediate grant of the repetition of grants.

5. The method of claim 1, wherein the grant repetition configuration indicates a relationship between resources that include respective grants of a second repetition of grants, the relationship indicating a subsequent resource of the resources in which to monitor for a subsequent grant of the second repetition of grants based at least in part on a prior resource of the resources that includes a prior grant of the second repetition of grants, the method further comprising:
   monitoring for the respective grants at the resources based at least in part on the relationship.

6. The method of claim 5, further comprising:
   performing soft combining during decoding of the prior grant and the subsequent grant of the second repetition of grants to identify a same second resource allocated for a second shared data channel in each of a first transmission time interval and a second transmission time interval; and
   performing soft combining during decoding of the shared data channel.

7. The method of claim 5, further comprising:
   decoding the prior grant to identify a first resource allocated for a first shared data channel in a first transmission time interval and the subsequent grant to identify a second resource allocated for a second shared data channel in a second transmission time interval; and decoding the first shared data channel corresponding to the first resource and the second shared data channel corresponding to the second resource.

8. The method of claim 1, wherein monitoring for the repetition of grants comprises:

receiving a grant corresponding to the determined grant repetition configuration; and decoding the shared data channel based at least in part on the received grant.

9. The method of claim 1, further comprising:

determining that each of the repetition of grants is transmitted within same frequency resources in different transmission time intervals based at least in part on the grant repetition configuration.

10. The method of claim 9, further comprising:

determining that data corresponding to the repetition of grants is transmitted within the shared data channel of the single transmission time interval based at least in part on the grant repetition configuration.

11. The method of claim 9, further comprising:

determining that data corresponding to the repetition of grants is transmitted within the shared data channel of each of the plurality of transmission time intervals based at least in part on the grant repetition configuration.

12. The method of claim 1, further comprising:

performing soft combining during decoding of the repetition of grants based at least in part on the grant repetition configuration indicating a coding technique applied to the repetition of grants.

13. The method of claim 1, further comprising:

performing soft combining during decoding of the repetition of grants based at least in part on the grant repetition configuration indicating a scrambling technique applied to a first grant of the repetition of grants.

14. The method of claim 1, further comprising:

processing the grant repetition parameter to identify the grant repetition configuration from the plurality of different grant repetition configurations for receiving repeated grants in a time domain.

15. The method of claim 1, wherein:

a first grant of the repetition of grants identifies resources allocated to the UE within the shared data channel of a first transmission time interval that occurs prior to a second transmission time interval of the first grant, wherein the first transmission time interval comprises the single transmission time interval.

16. The method of claim 1, further comprising:

buffering a plurality of symbols that are received in a first transmission time interval prior to a second transmission time interval of a first grant of the repetition of grants;

determining that the plurality of symbols include downlink data allocated to the UE in the first grant; and decoding the plurality of symbols based at least in part on the first grant.

17. An apparatus for wireless communication at a user equipment (UE), comprising:

a processor;

memory coupled with the processor; and instructions stored in the memory and operable, when executed by the processor, to cause the apparatus to:

receive a grant repetition parameter from a base station;

determine, from a plurality of different grant repetition configurations, a grant repetition configuration corresponding to the grant repetition parameter; and monitor, over a downlink control channel and over a plurality of transmission time intervals, for a repetition of grants corresponding to the determined grant repetition configuration, each grant of the repetition of grants scheduled in a different transmission time interval of the plurality of transmission time intervals, wherein each grant of the repetition of grants includes a different offset value relative to that respective grant that indicates a same resource that is allocated for a shared data channel, the same resource that is allocated for the shared data channel in a single transmission time interval that is commonly indicated by the different offset value included in each grant of the repetition of grants.

18. The apparatus of claim 17, wherein the instructions are further executable by the processor to cause the apparatus to:

receive a first grant of the repetition of grants, the first grant including a first offset value indicating a same transmission time interval as each other grant of the repetition of grants, wherein the same transmission time interval comprises the single transmission time interval;

decode the first grant based at least in part on the grant repetition parameter; and decode the shared data channel corresponding to the decoded first grant based at least in part on the first offset value.

19. The apparatus of claim 18, wherein the instructions are further executable by the processor to cause the apparatus to:

skip decoding of a second grant of the repetition of grants based at least in part on determining that decoding the first grant is successful.

20. The apparatus of claim 18, wherein the first grant is an intermediate grant of the repetition of grants.

21. The apparatus of claim 17, wherein the grant repetition configuration indicates a relationship between resources that include respective grants of a second repetition of grants, the relationship indicating a subsequent resource of the resources in which to monitor for a subsequent grant of the second repetition of grants based at least in part on a prior resource of the resources that includes a prior grant of the second repetition of grants, the instructions further executable by the processor to cause the apparatus to:

monitor for the respective grants at the resources based at least in part on the relationship.

22. The apparatus of claim 21, wherein the instructions are further executable by the processor to cause the apparatus to:

perform soft combining during decoding of the prior grant and the subsequent grant of the second repetition of grants to identify a same second resource allocated for a second shared data channel in each of a first transmission time interval and a second transmission time interval; and perform soft combining during decoding of the shared data channel.

23. The apparatus of claim 21, wherein the instructions are further executable by the processor to cause the apparatus to:

decode the prior grant to identify a first resource allocated for a first shared data channel in a first transmission time interval and the subsequent grant to identify a second resource allocated for a second shared data channel in a second transmission time interval; and decode the first shared data channel corresponding to the first resource and the second shared data channel corresponding to the second resource.

24. The apparatus of claim 17, wherein the instructions to monitor for the repetition of grants further are executable by the processor to cause the apparatus to:

receive a grant corresponding to the determined grant repetition configuration; and decode the shared data channel based at least in part on the received grant.

25. The apparatus of claim 17, wherein the instructions are further executable by the processor to cause the apparatus to:

determine that each of the repetition of grants is transmitted within same frequency resources in different transmission time intervals based at least in part on the grant repetition configuration.

26. The apparatus of claim 25, wherein the instructions are further executable by the processor to cause the apparatus to:

determine that data corresponding to the repetition of grants is transmitted within the shared data channel of the single transmission time interval based at least in part on the grant repetition configuration.

27. An apparatus for wireless communication at a user equipment (UE), comprising:

means for receiving a grant repetition parameter from a base station;

means for determining, from a plurality of different grant repetition configurations, a grant repetition configuration corresponding to the grant repetition parameter; and means for monitoring, over a downlink control channel and over a plurality of transmission time intervals, for a repetition of grants corresponding to the determined grant repetition configuration, each grant of the repetition of grants scheduled in a different transmission time interval of the plurality of transmission time intervals, wherein each grant of the repetition of grants includes a different offset value relative to that respective grant that indicates a same resource that is allocated for a shared data channel, the same resource that is allocated for the shared data channel in a single transmission time interval that is commonly indicated by the different offset value included in each grant of the repetition of grants.

28. A non-transitory computer-readable medium storing code for wireless communication at a user equipment (UE), the code comprising instructions executable by a processor to:

receive a grant repetition parameter from a base station;

determine, from a plurality of different grant repetition configurations, a grant repetition configuration corresponding to the grant repetition parameter; and monitor, over a downlink control channel and over a plurality of transmission time intervals, for a repetition of grants corresponding to the determined grant repetition configuration, each grant of the repetition of grants scheduled in a different transmission time interval of the plurality of transmission time intervals, wherein each grant of the repetition of grants includes a different offset value relative to that respective grant that indicates a same resource that is allocated for a shared data channel, the same resource that is allocated for the shared data channel in a single transmission time interval that is commonly indicated by the different offset value included in each grant of the repetition of grants.

* * * * *